(12) United States Patent
Mochizuki et al.

(10) Patent No.: US 7,461,885 B2
(45) Date of Patent: Dec. 9, 2008

(54) BACKREST MECHANISM FOR OPERATOR'S PLATFORM IN STAND-UP RIDER INDUSTRIAL VEHICLE

(75) Inventors: Akira Mochizuki, Kariya (JP); Takanori Mizuno, Kiyosu (JP)

(73) Assignee: Kabushiki Kaisha Toytoa Jidoshokki, Kariya-Shi (JP)

( * ) Notice: Subject to any disclaimer, the term of this patent is extended or adjusted under 35 U.S.C. 154(b) by 286 days.

(21) Appl. No.: 11/544,154

(22) Filed: Oct. 6, 2006

(65) Prior Publication Data

US 2007/0085393 A1    Apr. 19, 2007

(30) Foreign Application Priority Data

Oct. 7, 2005    (JP) ............................. 2005-295391
Jul. 5, 2006    (JP) ............................. 2006-185566

(51) Int. Cl.
*B60N 2/02*    (2006.01)
(52) U.S. Cl. .............................. 296/65.02; 297/344.18; 297/353
(58) Field of Classification Search ............. 296/65.02; 297/14, 339, 344.12, 344.18, 344.19, 344.2, 297/353

See application file for complete search history.

(56) References Cited

U.S. PATENT DOCUMENTS

2005/0093357 A1    5/2005    Takeda et al. ............... 297/353

FOREIGN PATENT DOCUMENTS

| DE | 299 02 139 U1 | 6/1999 |
|----|---------------|--------|
| DE | 100 00 622 A1 | 7/2001 |
| JP | 2001261293 A  | 9/2001 |
| JP | 2001-270694   | 10/2001 |
| JP | 2001270694 A  | 10/2001 |
| JP | 2004083188 A  | 3/2004 |
| JP | 2005-132525   | 5/2005 |

OTHER PUBLICATIONS

Korean Office Action dated Oct. 29, 2007, received in corresponding Patent Application No. 2006-0097545 without English translation.
German Office Action dated Jul. 26, 2007, received in corresponding German Patent Application No. 10 2006 047 403.1-22 with English translation.

*Primary Examiner*—Lori L Lyjak
(74) *Attorney, Agent, or Firm*—Morgan & Finnegan, LLP

(57) ABSTRACT

A backrest mechanism for a stand-up rider operator's platform in an industrial vehicle, in which an operator operates the vehicle while standing, has a support portion and a support holder. The support portion has a backrest portion for supporting a back of the operator and a seat portion for at least supporting buttocks of the operator. The support portion supports the operator by either of the backrest portion and the seat portion. The support holder is located on a rear side of the vehicle from the operator's platform. The support holder holds the support portion so that the support portion is detachable from the support holder.

10 Claims, 23 Drawing Sheets

BACKREST MECHANISM FOR OPERATOR'S PLATFORM IN STAND-UP RIDER INDUSTRIAL VEHICLE

BACKGROUND OF THE INVENTION

The present invention relates to a backrest mechanism for a stand-up rider operator's platform in an industrial vehicle.

Some of industrial vehicles such as towing tractors, order picking trucks and reach fork lift trucks have a stand-up rider operator's platform in which the operator keeps standing in controlling the vehicle operation. A vehicle of this stand-up rider operator's platform type generally has no seat for operator, so that the operator conducts towing or elevating operation while standing. A conventional backrest mechanism has been disclosed in Japanese Patent Application Publication No. 2005-132525, which is directed to stabilize operator's position. This backrest structure allows operators to conduct operation while being seated.

However, operators often walk through operator's platform in stand-up rider industrial vehicles, so that the backrest mechanism as disclosed in the above publication impedes operator's movement because it is located in the operator's platform. The backrest mechanism as disclosed in the above publication has a backrest portion and a seat portion. However, it does not allow the operator to conduct operation only with the backrest portion or only with the seat portion. Thus, the above backrest mechanism does not provide so many operating positions in accordance with operator's physical condition, fatigue, or the like. The present invention, which has been made in view of the above problems, is directed to a backrest mechanism for a stand-up rider operator's platform in an industrial vehicle, which is located at a position where the operator's movement is not impeded thereby and also permits the operator to use only either one of the backrest portion and the seat portion in operating the vehicle.

SUMMARY OF THE INVENTION

In accordance with the present invention, a backrest mechanism for a stand-up rider operator's platform in an industrial vehicle, in which an operator operates the vehicle while standing, has a support portion and a support holder. The support portion has a backrest portion for supporting a back of the operator and a seat portion for at least supporting buttocks of the operator. The support portion supports the operator by either of the backrest portion and the seat portion. The support holder is located on a rear side of the vehicle from the operator's platform. The support holder holds the support portion so that the support portion is detachable from the support holder.

In accordance with the present invention, a backrest mechanism for a stand-up rider operator's platform in an industrial vehicle, in which an operator operates the vehicle while standing, has a support portion and a support holder. The support portion has a shared portion which serves as a backrest portion for supporting a back of the operator when the shared portion is in a first position and which serves as a seat portion for at least supporting buttocks of the operator when the shared portion is in a second position. The support portion supports the operator by the shared portion. The support holder is located on a rear side of the vehicle from the operator's platform. The support holder holds the support portion so that the support portion is rotatable relative to the support holder.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

The following will describe a first preferred embodiment of a towing tractor 10, as an example of an industrial vehicle, according to the present invention with reference to FIGS. 1 through 9. In the following description, right and left will refer to the sides of the towing tractor as viewed from the operator facing in the forward traveling direction of the vehicle.

Figure 1:
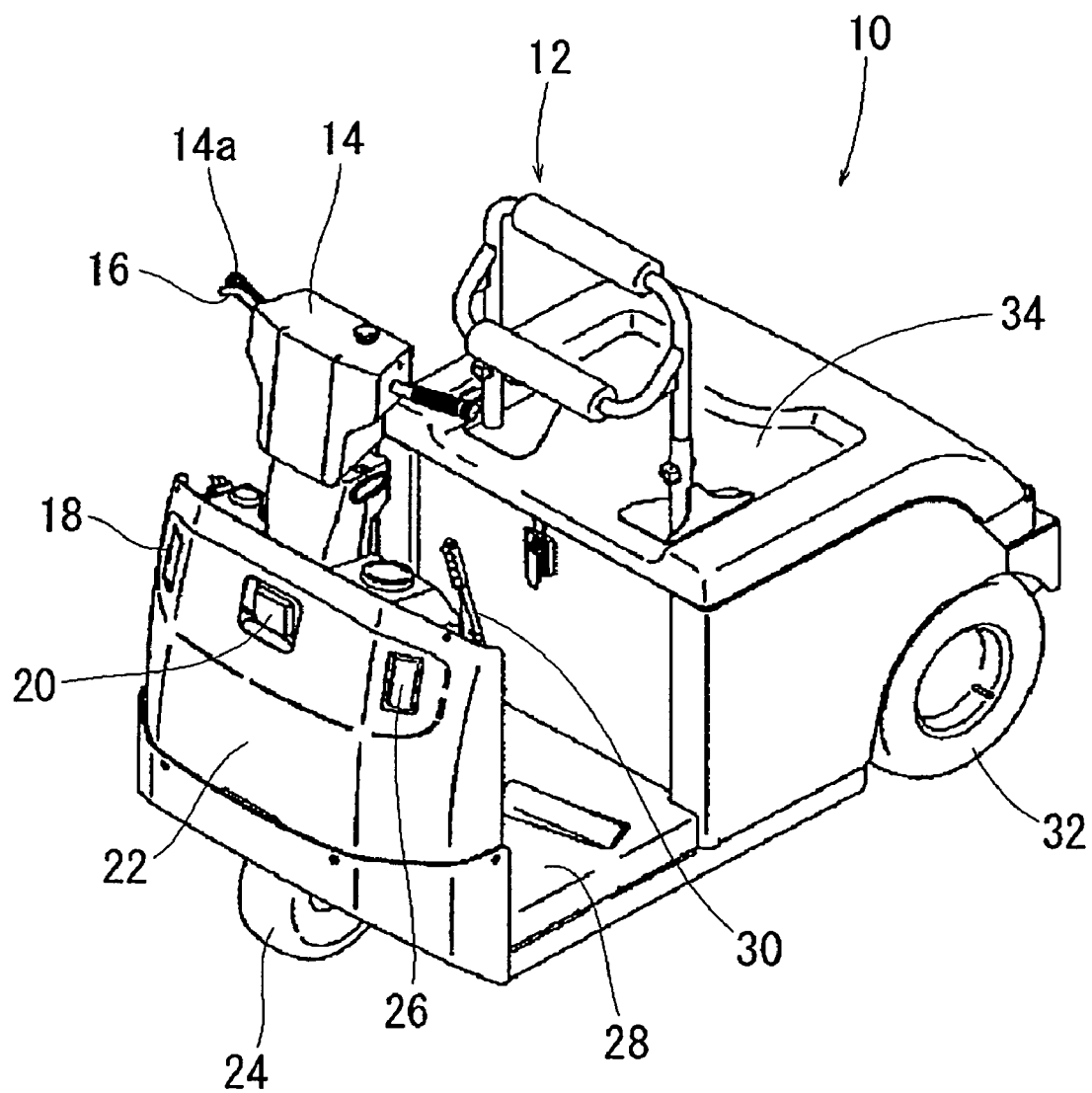
FIG. 1 is a perspective view of a towing tractor according to a first preferred embodiment of the present invention.
Figure 2:
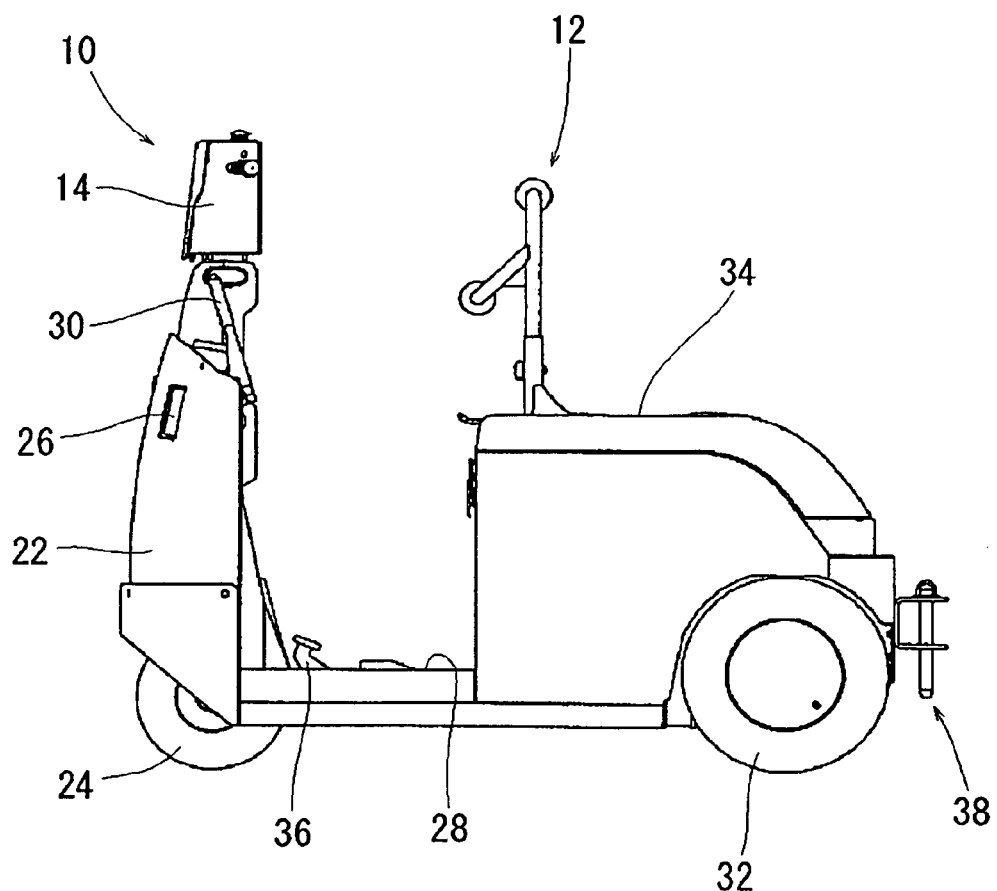
FIG. 2 is a side view of the towing tractor according to the first preferred embodiment of the present invention.
Figure 3:
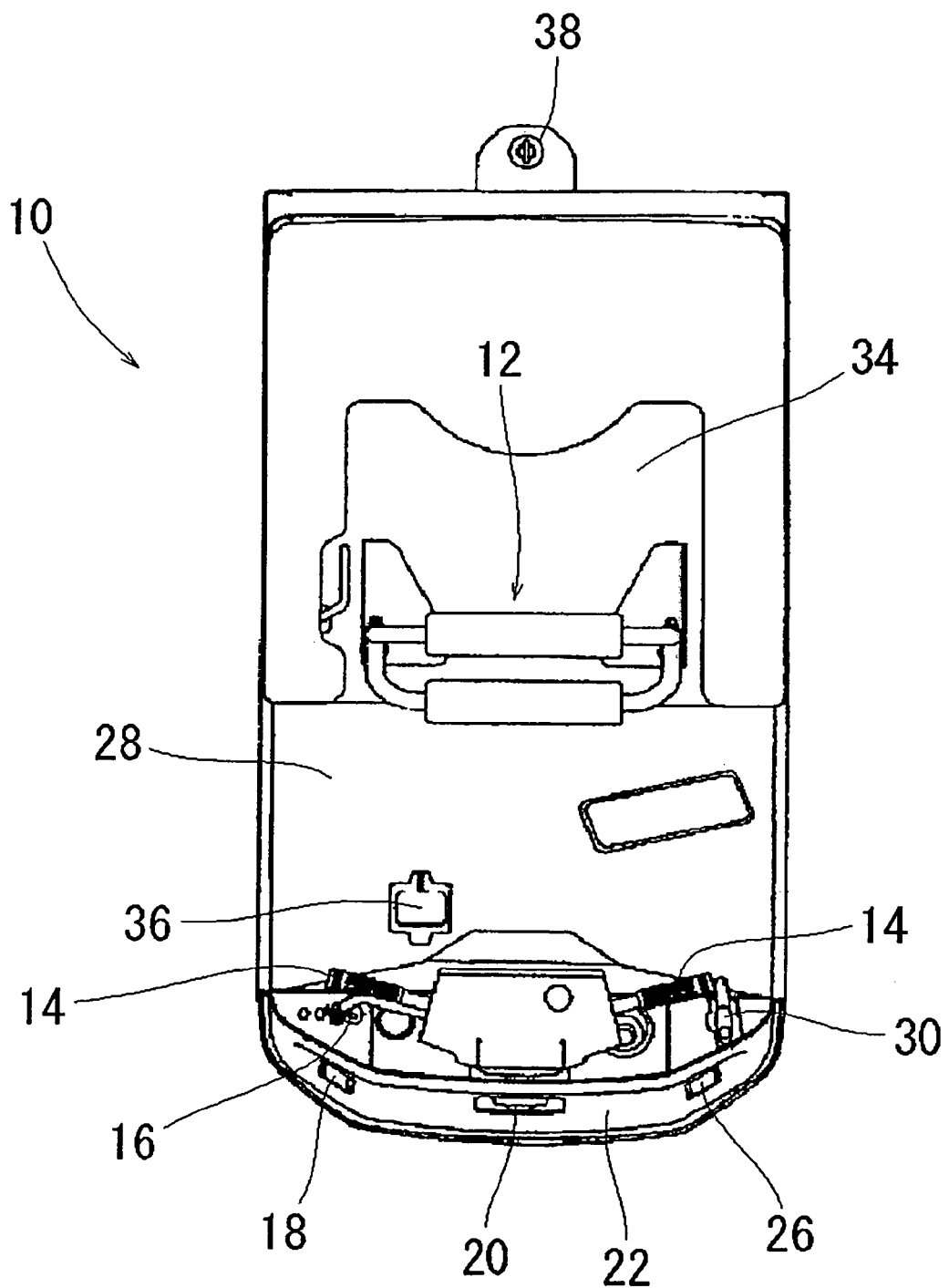
FIG. 3 is a plan view of the towing tractor according to the first preferred embodiment of the present invention.

The structure of the towing tractor 10 will now be described while referring to FIGS. 1 through 3.

Major parts of the towing tractor 10 include, as viewed rearward of the vehicle, a front wheel 24, a front frame 22, an operator's platform 28, a battery casing 34, rear wheels 32 and a drawbar device 38. The front frame 22 is provided with a steering 14 for operating the towing tractor 10 through handgrips 14a, winker lamps 18, 26 for providing a turn signal, a headlamp 20 for lighting forward, a brake lever 30 of a brake device for parking and a driving device stored therein. The operator's platform 28 is of a stand-up rider type, having a brake pedal 36 on its floor and an entrance on each of the right and left sides. In other words, the towing tractor 10 has no seat for operator, and the operator conducts towing operation, or the like, while standing. The battery casing 34 contains therein a battery (not shown) which serves as a power source of the towing tractor 10 and has mounted on the top surface thereof a backrest mechanism 12. The drawbar device 38 is used in towing the vehicles, or the like, carrying a load.

The backrest mechanism 12 will now be described more in detail with reference to FIGS. 4 through 7.

Figure 4:
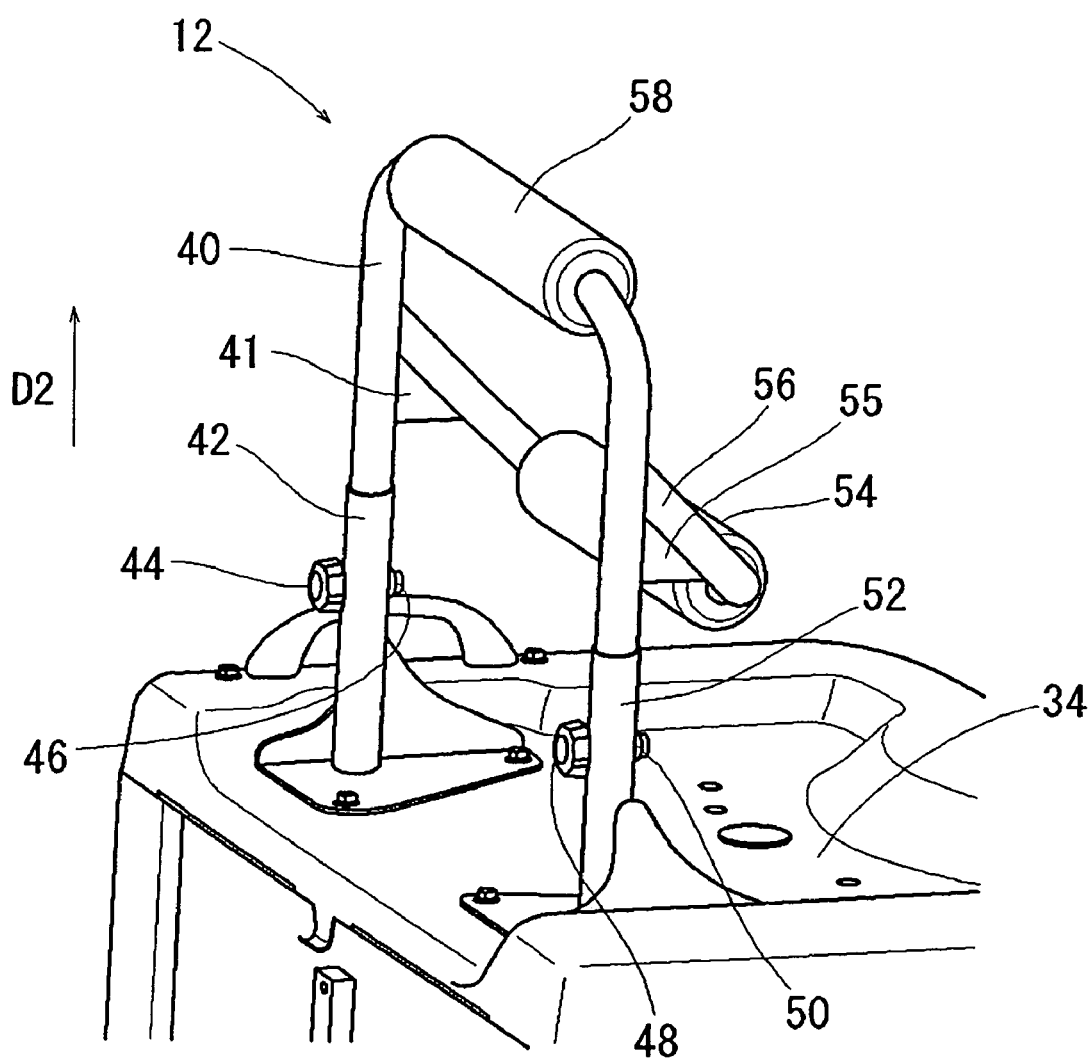
FIG. 4 is a perspective view of a backrest mechanism of the towing tractor when a backrest portion is used according to the first preferred embodiment of the present invention.
Figure 5:
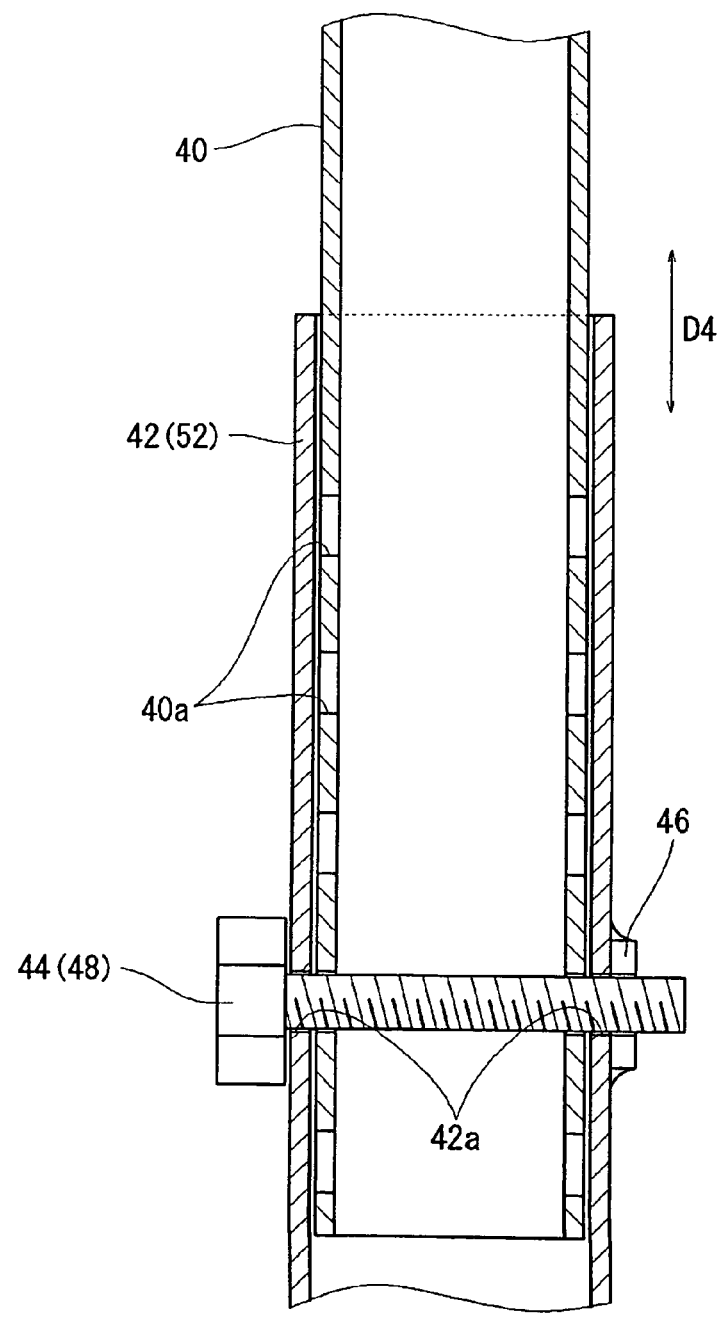
FIG. 5 is a sectional view of a height adjustment mechanism according to the first preferred embodiment of the present invention.
Figure 6:
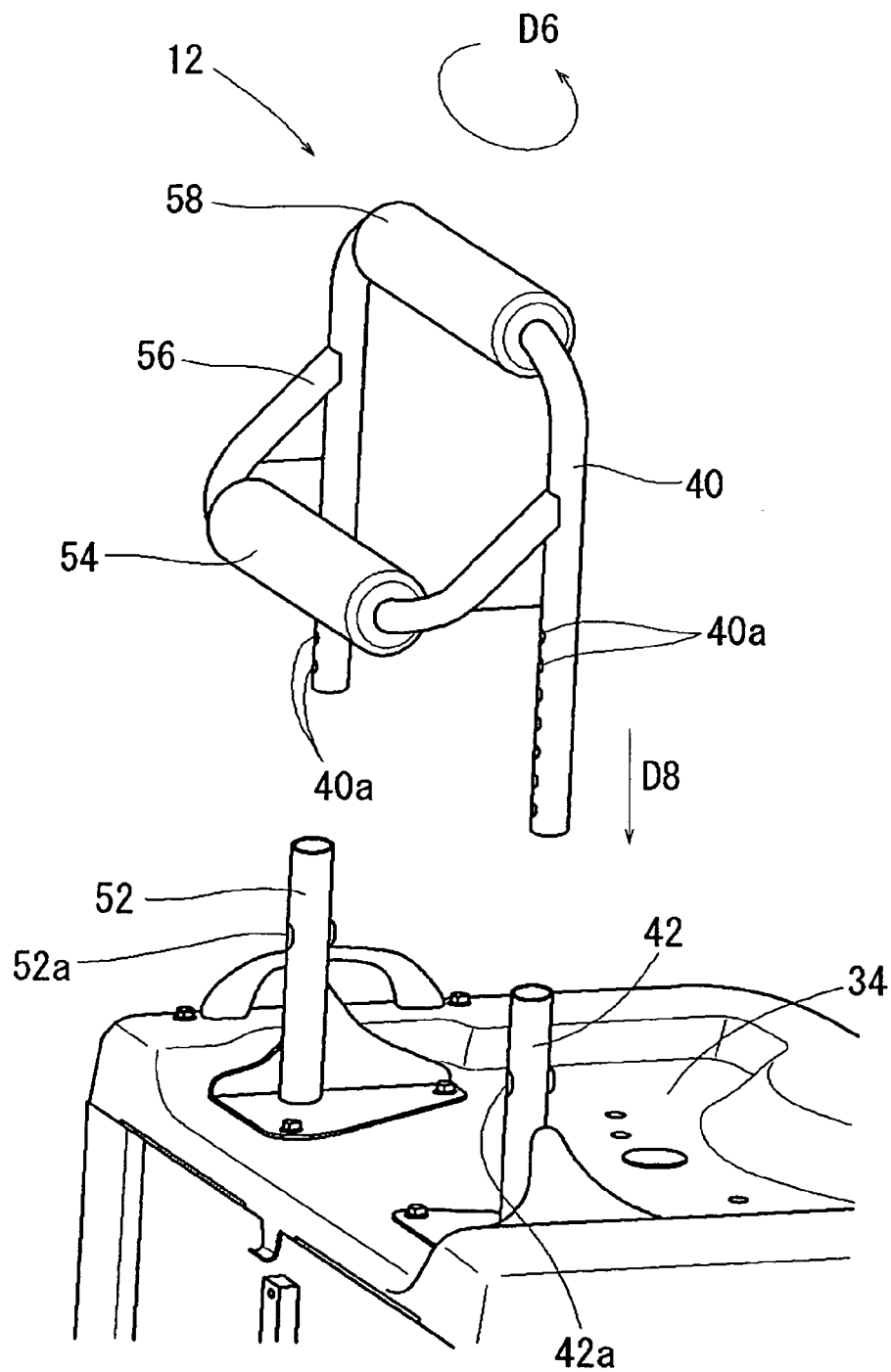
FIG. 6 is a perspective view of the backrest mechanism, showing a way to switch a portion to be used according to the first preferred embodiment of the present invention.
Figure 7:
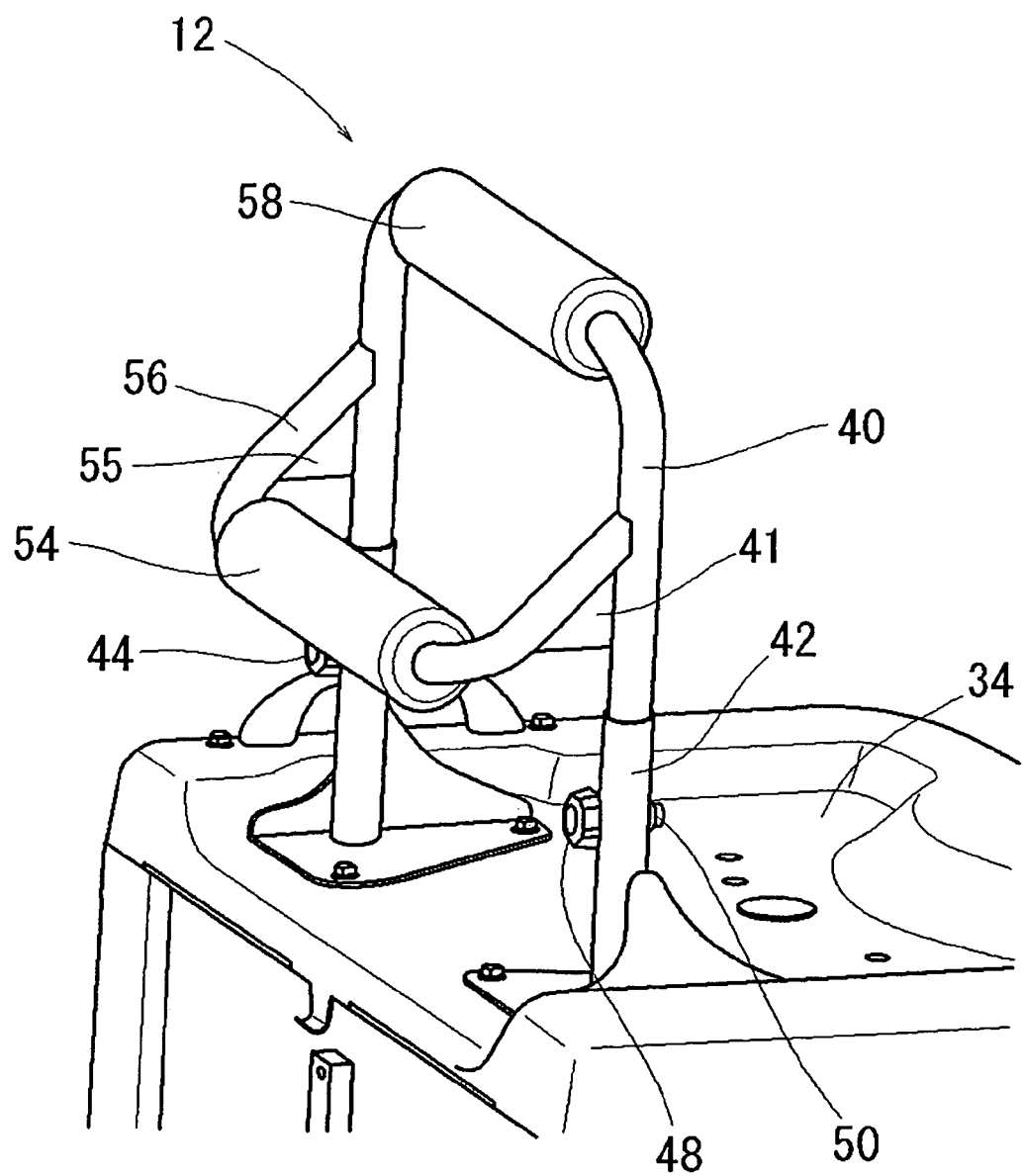
FIG. 7 is a perspective view of the backrest mechanism when a seat portion is used according to the first preferred embodiment of the present invention.

The backrest mechanism 12 includes a backrest portion 40, a seat portion 56 and support holders 42, 52. The backrest portion 40 and the seat portion 56 correspond to a support portion. As shown in FIGS. 5 and 6, the backrest portion 40 is formed of a U-shaped pipe and provided at the top thereof with a cushion 58 against which the operator may lean and also a plurality of through-holes 40a near each end of the backrest portion 40. The seat portion 56 is also formed of a U-shaped pipe and provided with a cushion 54. The seat portion 56 is welded to the backrest portion 40 at a specified angle with reinforcing plates 41, 55 provided at lower side of the seat portion 56 for reinforcement to keep the seat portion 56 at the specified angle, as shown in FIGS. 4, 6, and 7. As indicated by double-headed arrow D4, the ends of the backrest portion 40 are movable relative to and detachable from the support holders 42, 52. The support holders 42, 52 fixed to the upper surface of the battery casing 34 include nuts 46, 50 for fixing the backrest portion 40 and the seat portion 56 with bolts 44, 48.

In the backrest mechanism 12 shown in FIG. 4, the backrest portion 40 and the seat portion 56 are fastened to the support holders 42, 52 with the bolts 44, 48. Thus, the operator can operate the vehicle while being supported by the backrest portion 40 (specifically, by the cushion 58). When the operator wants to conduct the operation while being supported by the seat portion 56 (especially, by the cushion 54), the position of the support portion may be changed as follows. After bolts 44, 48 are removed, the backrest portion 40 and the seat portion 56 are pulled upward (in the direction indicated by the arrow D2) from the support holders 42, 52 and then rotated by 180 degree as indicated by the arrow D6, resulting in the position shown in FIG. 6. Subsequently, the backrest portion 40 and the seat portion 56 are lowered in the direction indicated by the arrow D8 into the support holders 42, 52 and fastened thereto by the bolts 44, 48, resulting in the position shown in FIG. 7. Thus, the seat portion 56 is positioned forward of the backrest portion 40 and, therefore, the vehicle operator can be supported by the seat portion 56 in operating the vehicle.

Figure 8:
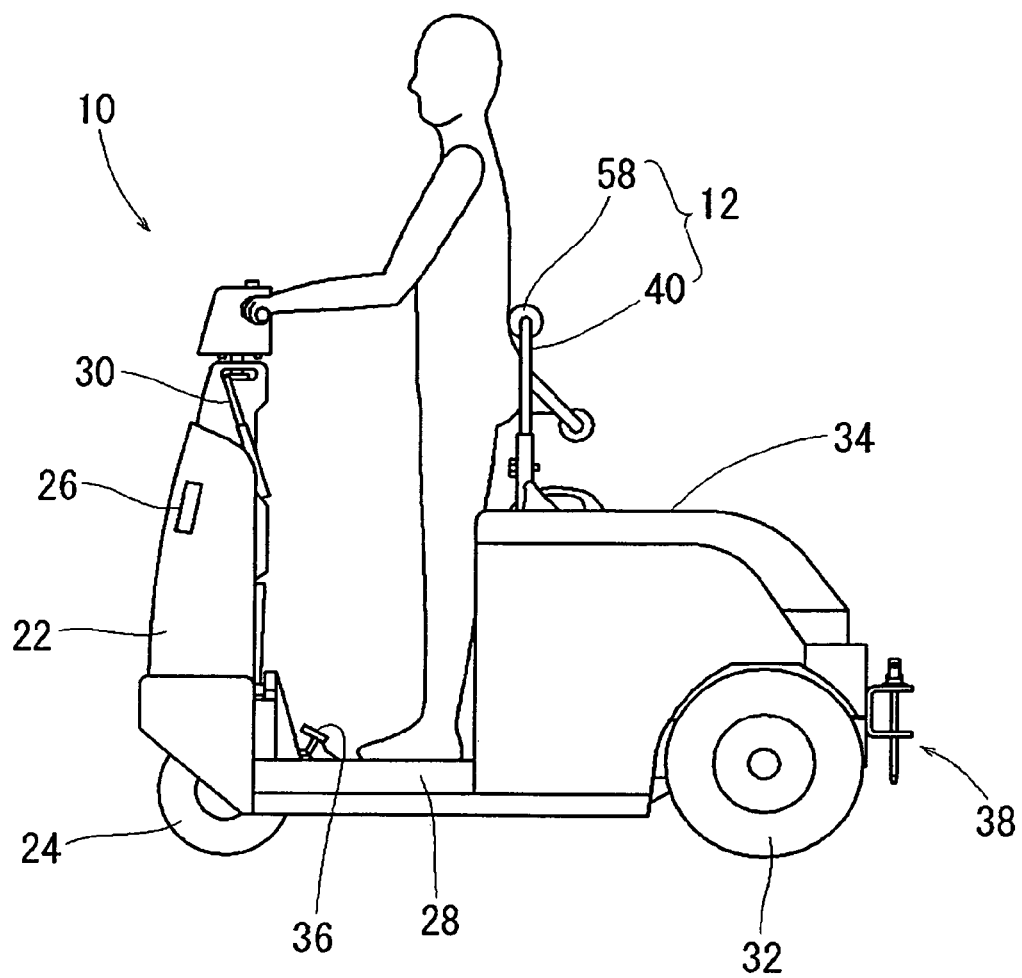
FIG. 8 is a side view of the towing tractor which is operated by an operator supported by the backrest portion according to the first preferred embodiment of the present invention.
Figure 9:
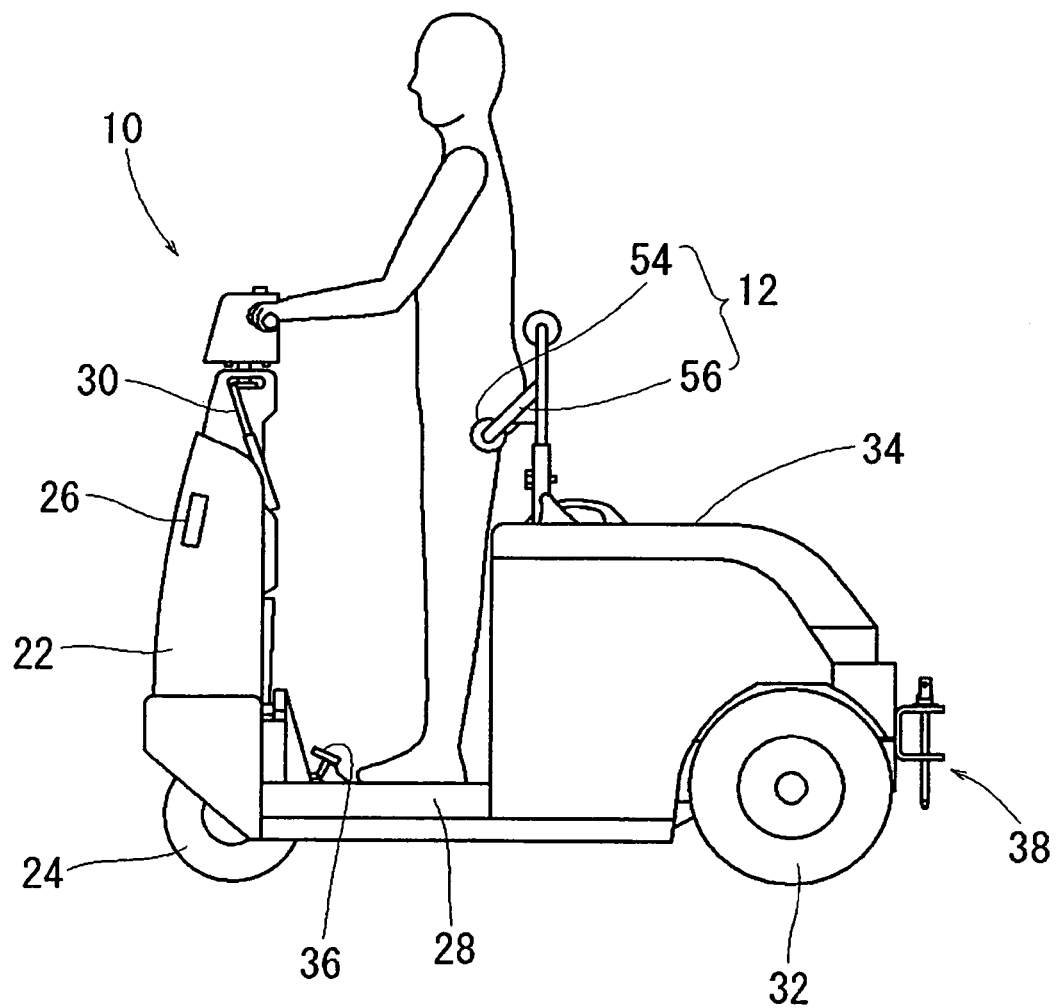
FIG. 9 is a side view of the towing tractor which is operated by an operator supported by the seat portion according to the first preferred embodiment of the present invention.

When the backrest portion 40 is positioned forward as shown in FIG. 4, the operator will be supported at the back by the cushion 58, as shown in FIG. 8, in operating the towing tractor 10. On the other hand, when the seat portion 56 is positioned forward as shown in FIG. 7, the operator will be supported at the buttocks by the cushion 54, as shown in FIG. 9.

According to the first preferred embodiment, the following advantageous effects are obtained.

(a1) The support portion of the backrest mechanism 12 (or the backrest portion 40 and the seat portion 56) may be installed in the support holders 42, 52 in either one of the two different positions (FIGS. 4 and 7) and, depending on the position of the support portion, the operator may be supported by either of the backrest portion 40 and the seat portion 56. Thus, the operator may set the support portion of the backrest mechanism 12 in the support holders in such a position that either of the backrest portion and the seat portion 56 is selected for support by the operator. Thus, in view of operator's condition, fatigue, or the like, either the backrest portion 40 or the seat portion 56 is used for supporting the operator operating the vehicle. In addition, the support holders 42, 52 are located on the rear side from the operator's platform 28, so that the support portions 40, 56 do not impede an operator who often passes through the operator's platform 28.

(a2) A height adjustment mechanism using mechanical means (i.e. a plurality of through-holes 40a, bolts 44, 48 and nuts 46, 50 provided for the backrest portion 40) allows the backrest portion 40 and the seat portion 56 to be adjusted, or elevated or lowered, in accordance with operator's height. The backrest mechanism 12 thus ensures comfortable operating position, thereby helping to reduce operator's fatigue.

The following will describe a second preferred embodiment of the towing tractor 10 of the present invention having a backrest mechanism that is different from that of the first preferred embodiment while making reference to FIGS. 10 through 14. The structure of the towing tractor 10 of the second preferred embodiment is similar to that of the first preferred embodiment and, therefore, only different features will be mainly described for the sake of simplicity of illustration and description. The same reference numerals are used to denote those components which are similar to the counterparts of the first preferred embodiment and, therefore, the description therefor is omitted.

The structure of a backrest mechanism 80 will now be described with reference to FIGS. 10 through 12. Apparently, the backrest mechanism 80 of FIG. 10 corresponds to the backrest mechanism 12 of FIG. 4.

Figure 10:
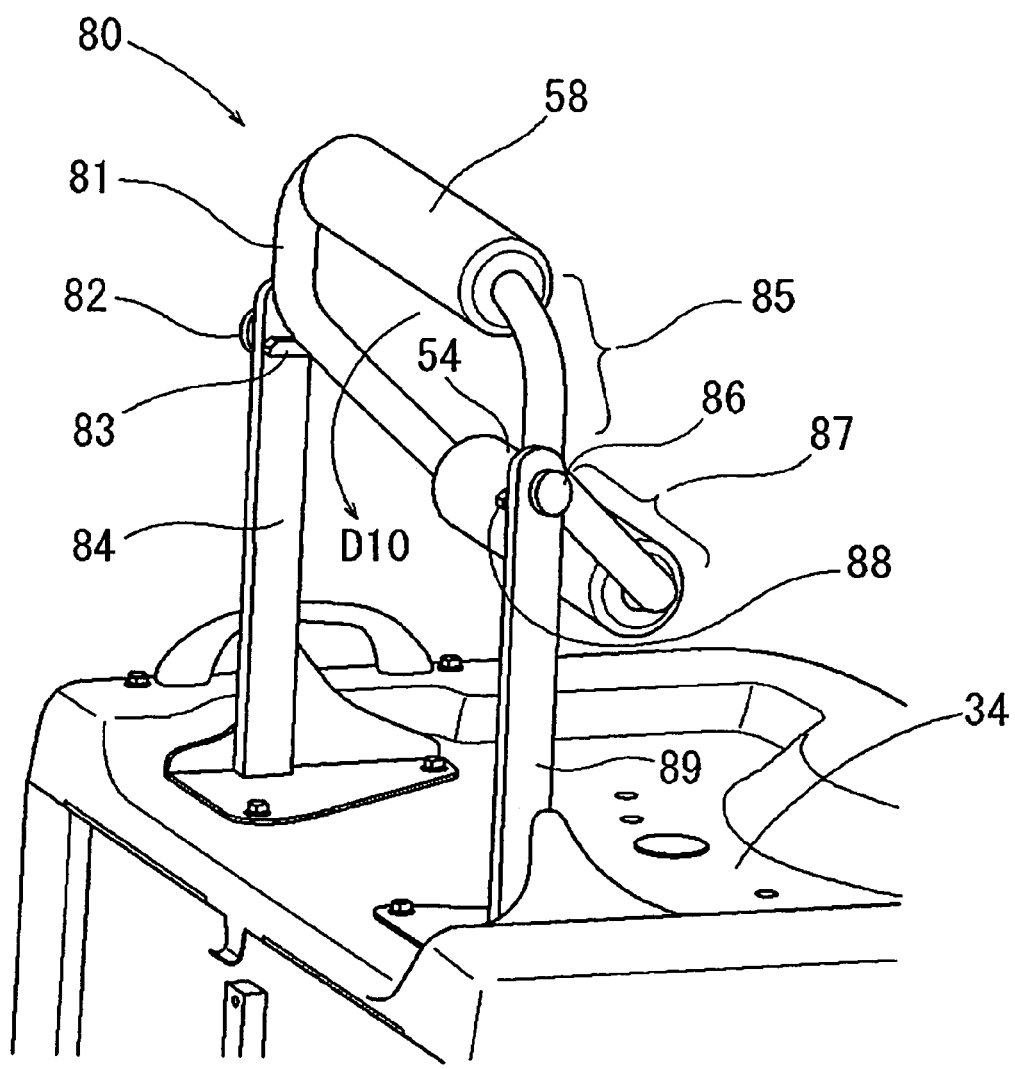
FIG. 10 is a perspective view of a backrest mechanism when a shared portion is used as a backrest portion according to a second preferred embodiment of the present invention.

The backrest mechanism 80 shown in FIG. 10 includes a support member 81 and support holders 84, 89. The support member 81 which corresponds to the support portion is made of a pipe which is bent in a square shape as seen in plan view and the pipe of each side of the support member 81 is bent in a dogleg at a specified angle. As seen from the lateral side of the support member 81, the part thereof designated by reference numeral 85 is a shared portion while the part with numeral 87 is a backrest portion. The shared portion 85 is provided with a cushion 58 for contact with an operator. The backrest portion 87 is provided with a similar cushion 54.

Figure 11:
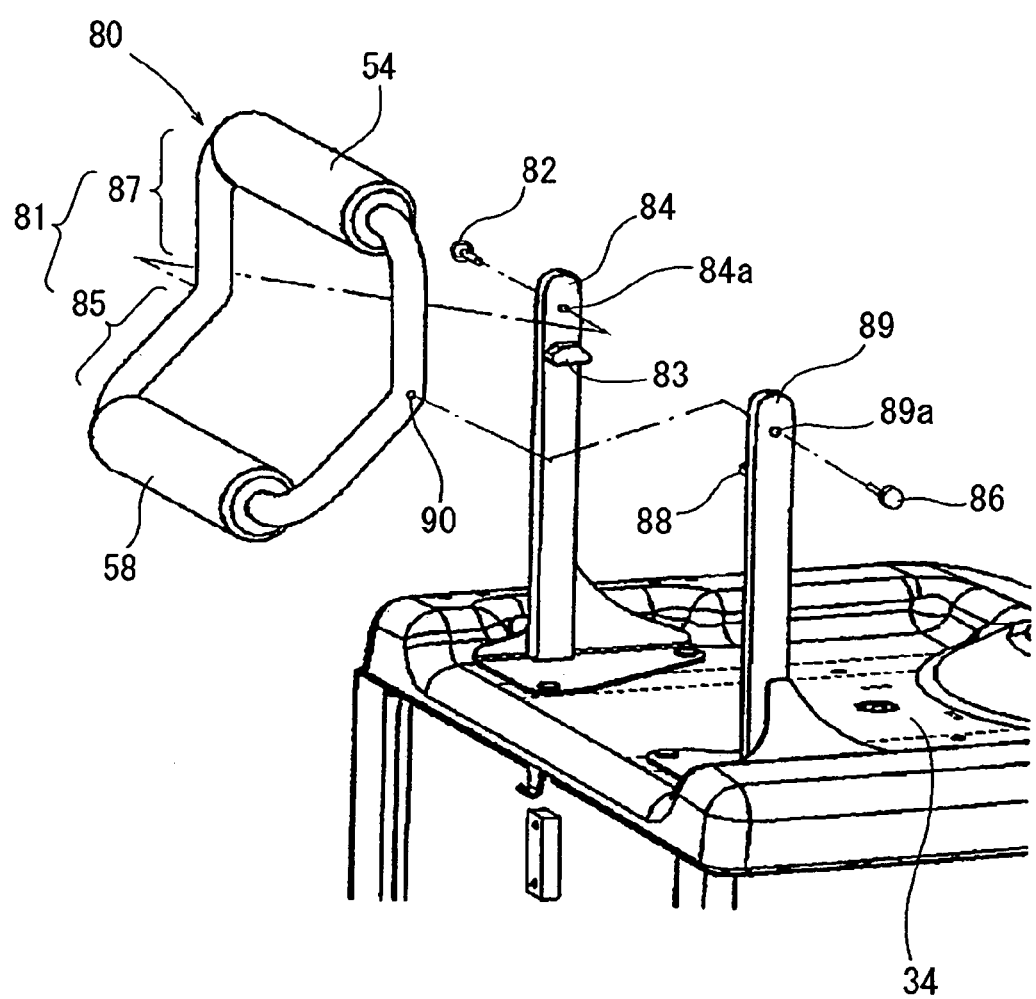
FIG. 11 is an exploded perspective view of a structure of the backrest mechanism according to the second preferred embodiment of the present invention.

Referring to FIG. 11, the support member 81 has two dogleg portions, each having a hole 90. The support holders 84, 89 have aligned holes 84a, 89a adjacent to their upper ends, and the surfaces of the support holders 84, 89 facing their opposite counterpart support holders are provided with stop plates 83, 88, respectively. The support member 81 is connected securely to the support holders 84, 89 by means of a screw 82 passing through the hole 84a and the hole 90 on one side of the support member 81 and a screw 86 passing through the hole 89a and the hole 90 on the other side of the support member 81. Loosening the screws 82, 86 allows the support member 81 to be rotatable. The stop plates 83, 88 serve to stop either one of the shared portion 85 and the backrest portion 87 when the other of the shared portion 85 and the backrest portion 87 is positioned upright.

When it is desired to use the shared portion 85 as a seat when the shared portion 85 is positioned upright as shown in FIG. 10, the position of the support member 81 may be changed as follows. Firstly, the screws 82, 86 then fastening the support member 81 to the support holders 84, 89 are loosened to such an extent that the support member 81 becomes rotatable about the screw 82, 86. Then, the support member 81 is rotated, for example, in the direction indicated by the arrow D10 in FIG. 10. By so doing, the backrest portion 87 is positioned upright and the shared portion 85 is lowered in forward position, as shown in FIG. 12, with the result that operators may use the shared portion 85 as a seat portion. When it is desired to use the shared portion 85 as a backrest, a procedure reverse to the above may be used.

Figure 13:
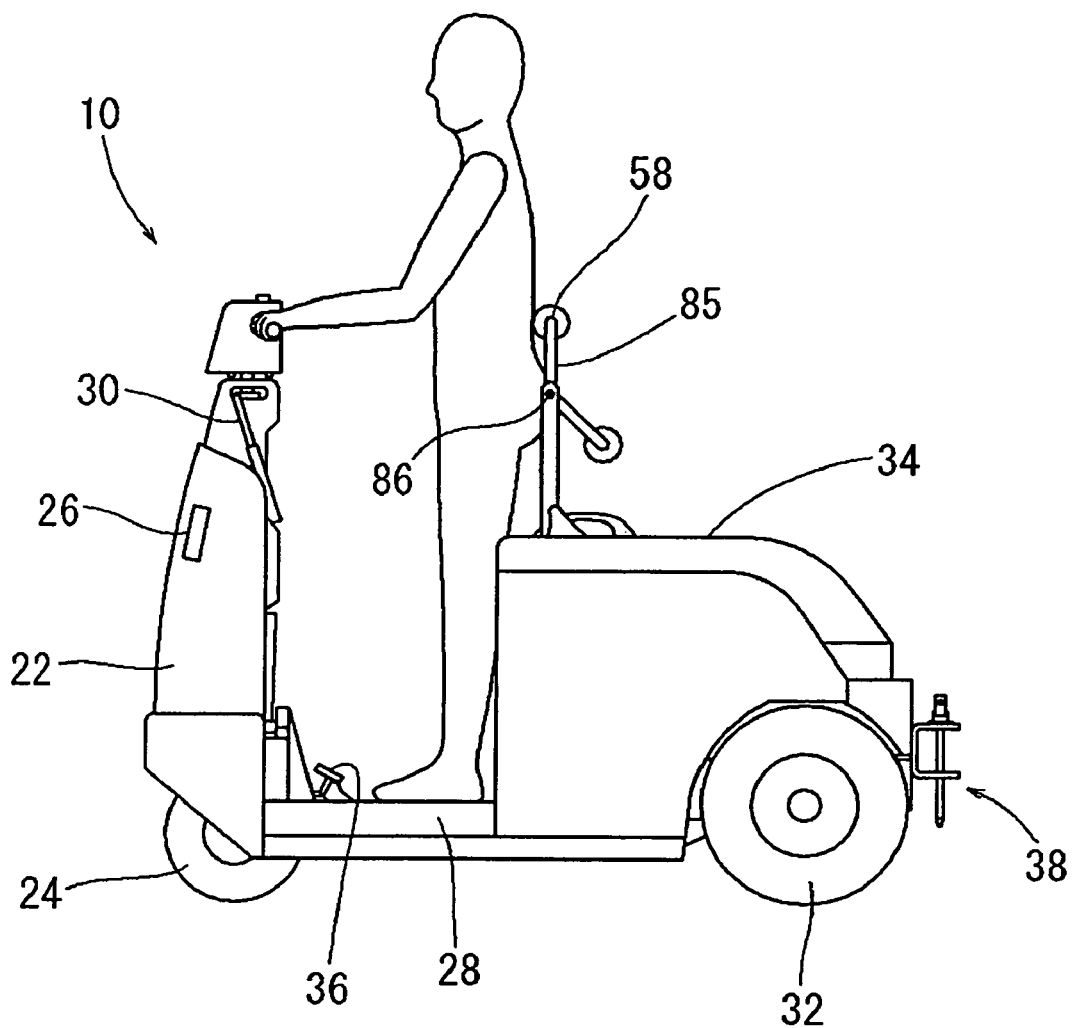
FIG. 13 is a side view of a towing tractor which is operated by an operator supported by the backrest portion according to the second preferred embodiment of the present invention.
Figure 14:
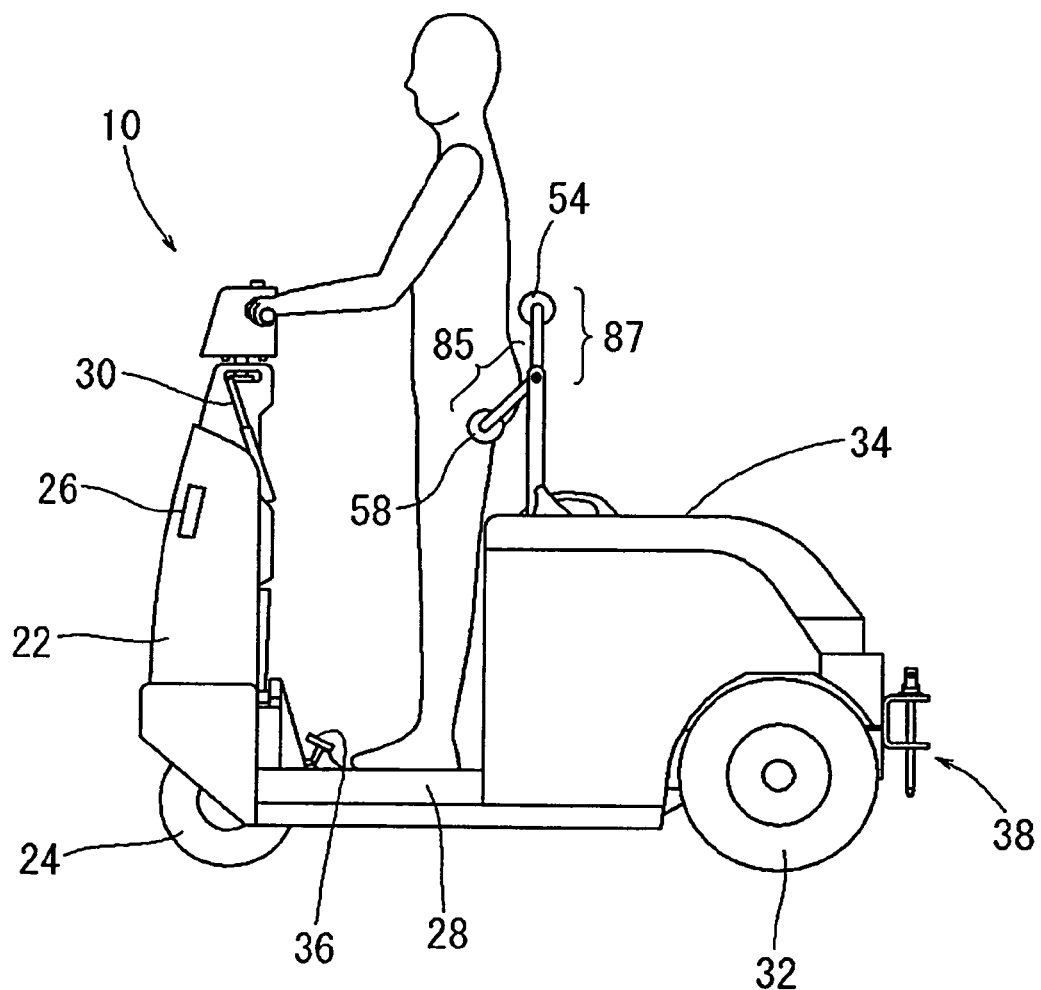
FIG. 14 is a side view of a towing tractor which is operated by an operator supported by the seat portion according to the second preferred embodiment of the present invention.

When the shared portion 85 is positioned upright, the operator operating the towing tractor 10 is supported at the back by the cushion 58 as shown in FIG. 13. On the other hand, when the backrest portion 87 is positioned upright, the operator is supported at the buttocks by the cushion 58 as shown in FIG. 14 and additionally at the back by the cushion 54 depending on the operator's posture in operating the towing tractor 10.

According to the second preferred embodiment, the following advantageous effects are obtained.

Figure 12:
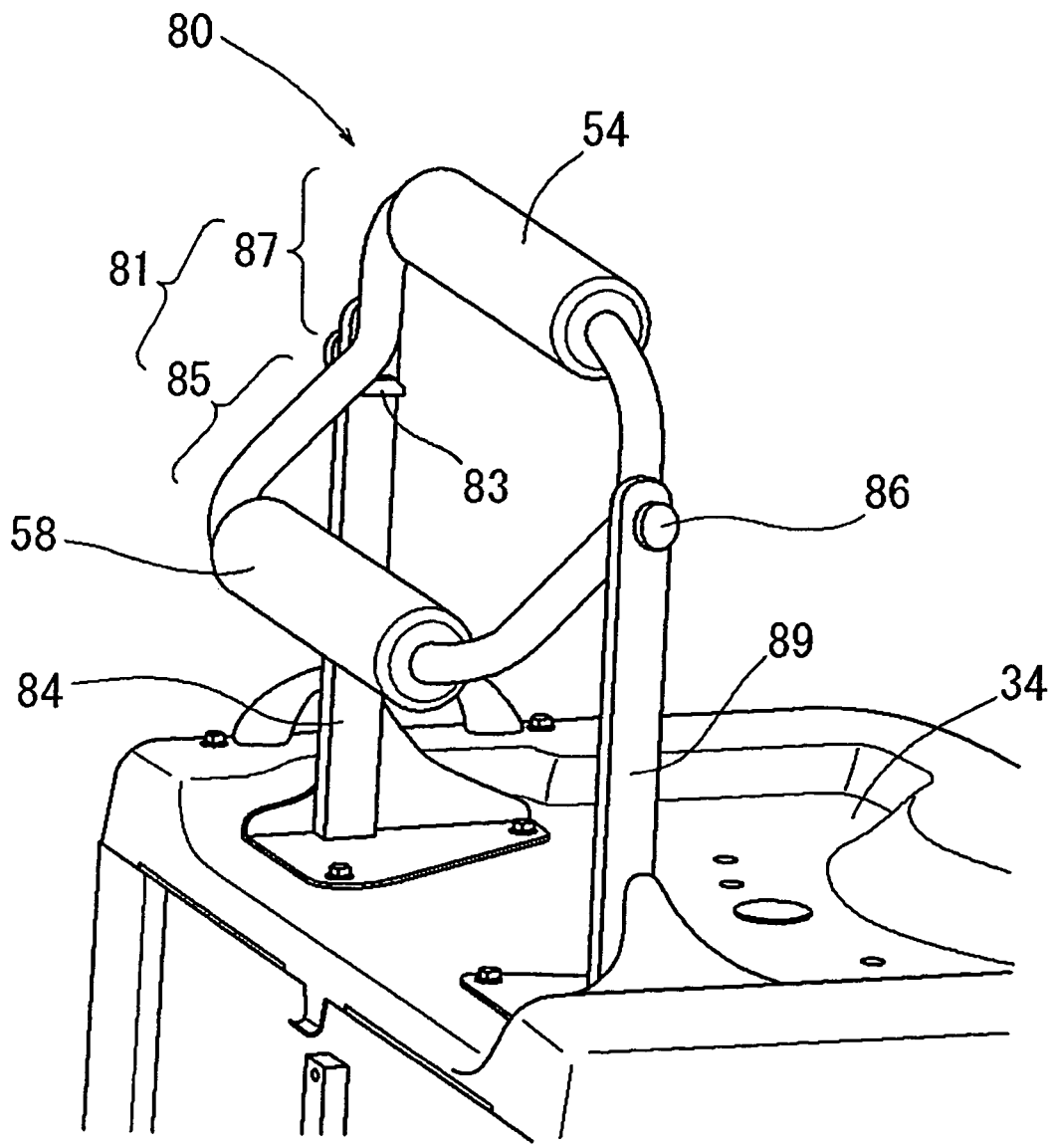
FIG. 12 is a perspective view of the backrest mechanism when the shared portion is used as a seat portion according to the second preferred embodiment of the present invention.

(b1) The rotatable support member 81 can be arranged to make either the shared portion 85 or the backrest portion 87 to be positioned upright and this position is fixed by the screw 82 thereby to provide a stabilized support for a vehicle operator (FIGS. 10 and 12). Thus, the support member 81 may be selectively positioned depending on as which of the backrest portion and seat portion the operator needs to use the shared portion 85. Thus, in view of the operator's condition, fatigue, or the like, the shared portion 85 (as well as the backrest portion 87) is used in conducting vehicle operation. Furthermore, the support holders 84, 89 are located on the rear side from the operator's platform 28, so that the support member 81 does not impede an operator who often passes through the operator's platform 28. In the second preferred embodiment, the support member 81 has the shared portion 85 and the backrest portion 87; however, the support member 81 having the shared portion 85 only can also achieve the same advantageous effects.

(b2) The other features, structure, operation, or the like, are the same as those of the first preferred embodiment, so that the same advantageous effects as those described in the paragraphs (a1) and (a2) are obtained.

The present invention is not limited to the embodiments described above, but it may be modified into various embodiments as exemplified below.

Figure 15:
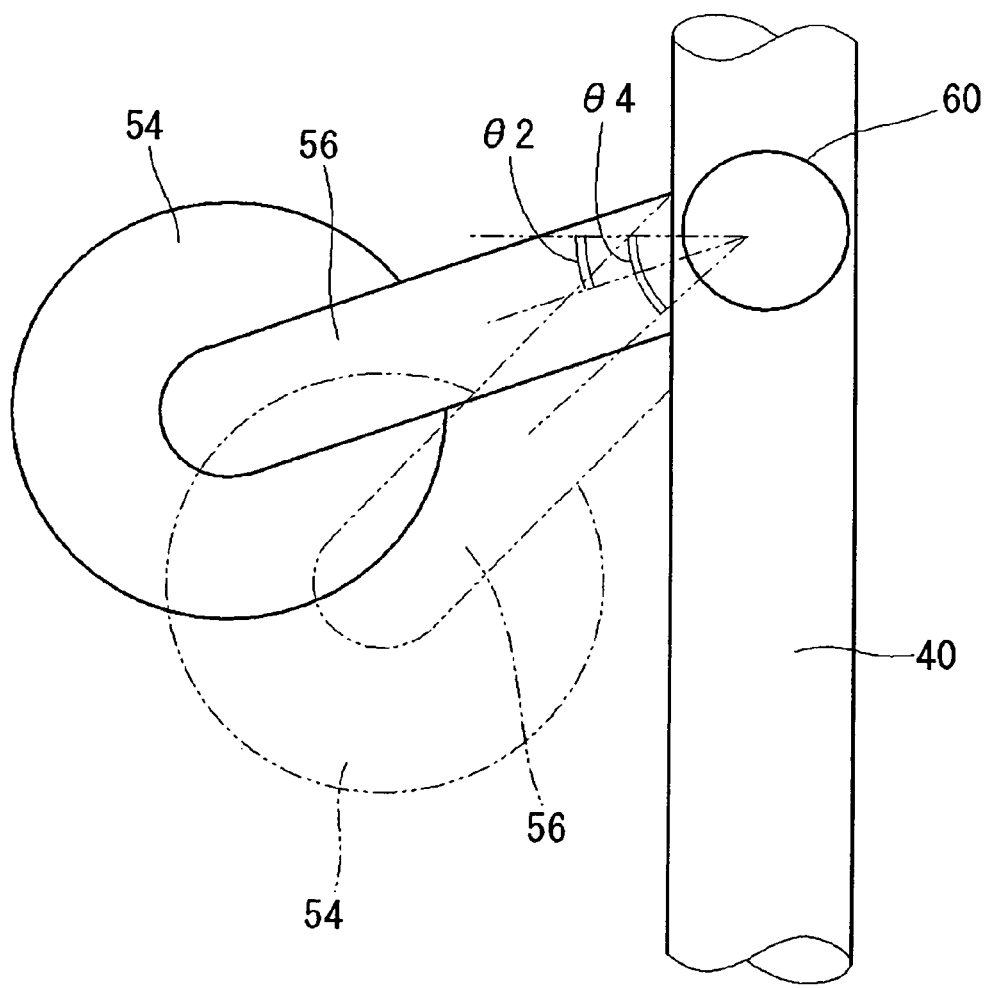
FIG. 15 is a side view of a first angle adjustment mechanism according to an alternative embodiment of the present invention.

(c1) In the first preferred embodiment, the reinforcing plates 41, 55 are welded under the seat portion 56 (FIGS. 4, 6 and 7), so that the angle between the backrest portion 40 and the seat portion 56 is fixed. In an alternative embodiment, the angle between the backrest portion 40 and the seat portion 56 may be changeable. For example, as shown in FIG. 15, the backrest portion 40 has an angle adjustment knob 60 which is rotatable for adjustment of the seat portion 56 to the angle θ2 indicated by solid line, the angle θ4 indicated by two-dotted line, or any other angles. Thus, the angle of the seat portion 56 is adjustable so as to fit the operator's figure (especially, his buttocks), so that operator's fatigue may be reduced by ensuring more comfortable operating position.

Figure 16:
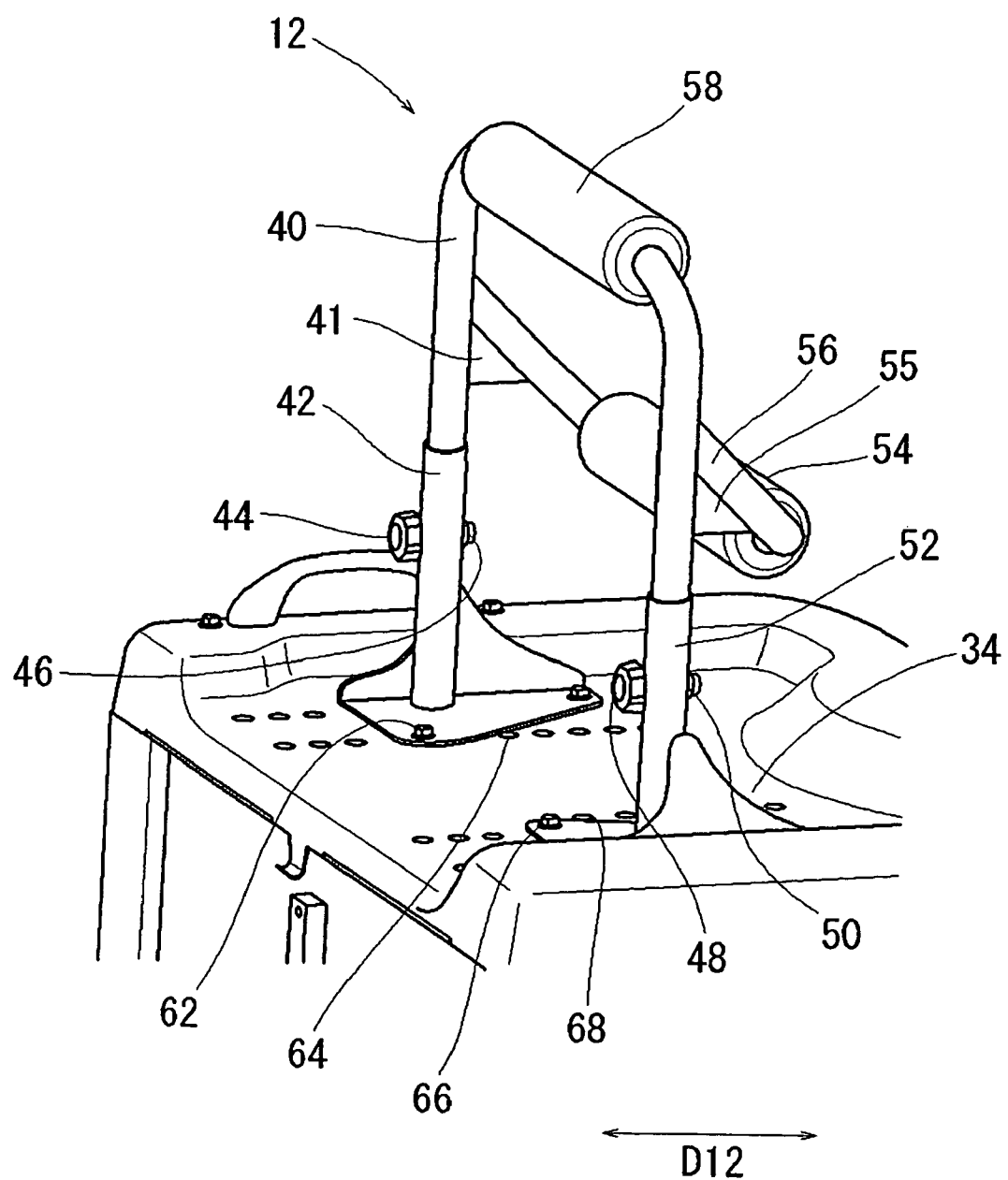
FIG. 16 is a perspective view of a backrest mechanism, showing a horizontal positioning mechanism according to an alternative embodiment of the present invention.

(c2) In the first preferred embodiment, the support holders 42, 52 are located at fixed positions on the upper surface of the battery casing 34 (for example, FIG. 4). In an alternative embodiment, the support holders 42, 52 are adjustable so that their horizontal positions are changeable. As shown in FIG. 16, a plurality of lines of holes 64, 68 are formed longitudinally on the top surface of the battery casing 43 for receiving therein fastening bolts 62, 66, respectively. In this case, appropriate holes 64, 68 are selected and the support holders 42, 52 are secured to the battery casing 43 by the fastening bolts 62, 66, respectively. Thus, the horizontal position of the backrest portion 40 or the seat portion 56 is adjustable longitudinally (in the direction indicated by the arrow D12), so that operator's fatigue may be reduced by ensuring more comfortable operating position. In the above structure, the bolts 62, 66 and a plurality of the holes 64, 68 constitute the horizontal positioning mechanism of the present invention. Furthermore, if the support holders 42, 52 are made slidable longitudinally, the horizontal position of the backrest portion 40 and the seat portion 56 is slidable therewith.

(c3) In the first preferred embodiment, the U-shaped backrest portion 40 is held by two support holders 42, 52 (for example, FIG. 6). In an alternative embodiment shown in FIG. 17, the backrest mechanism 12 includes a square-shaped backrest portion 70 and a single upright portion 72 extending from the lower center of the backrest portion 70. This upright portion 72 corresponds to the ends of the backrest portion 40 (FIG. 6) and is formed with a plurality of through-holes as in the case of the backrest portion 40 of FIG. 6. Then a support holder 74 corresponding to the support holders 42, 52 of FIG. 6 is fixedly mounted at a position that is center in widthwise direction of the vehicle and on the rear side of the vehicle from the operator's platform 28. The relation between the backrest portion 70 and the support holder 74 corresponds to the relation between the backrest portion 40 and the support holder 42 as shown in FIG. 5, and the backrest portion 70 is fixed to the support holder 74 by bolt 76 and nut 78. In fixing the backrest portion 70, the height of the backrest portion 70 may be adjusted by selecting an appropriate through-hole for inserting therethrough the bolt 76. In this arrangement, the backrest portion 70 and the support holder 74 correspond to the support portion of the present invention. In addition, the use of the bolt 76 and the nut 78 for fixing the support portion to the support holder 74 helps to prevent the rotation of the support portion.

Figure 17:
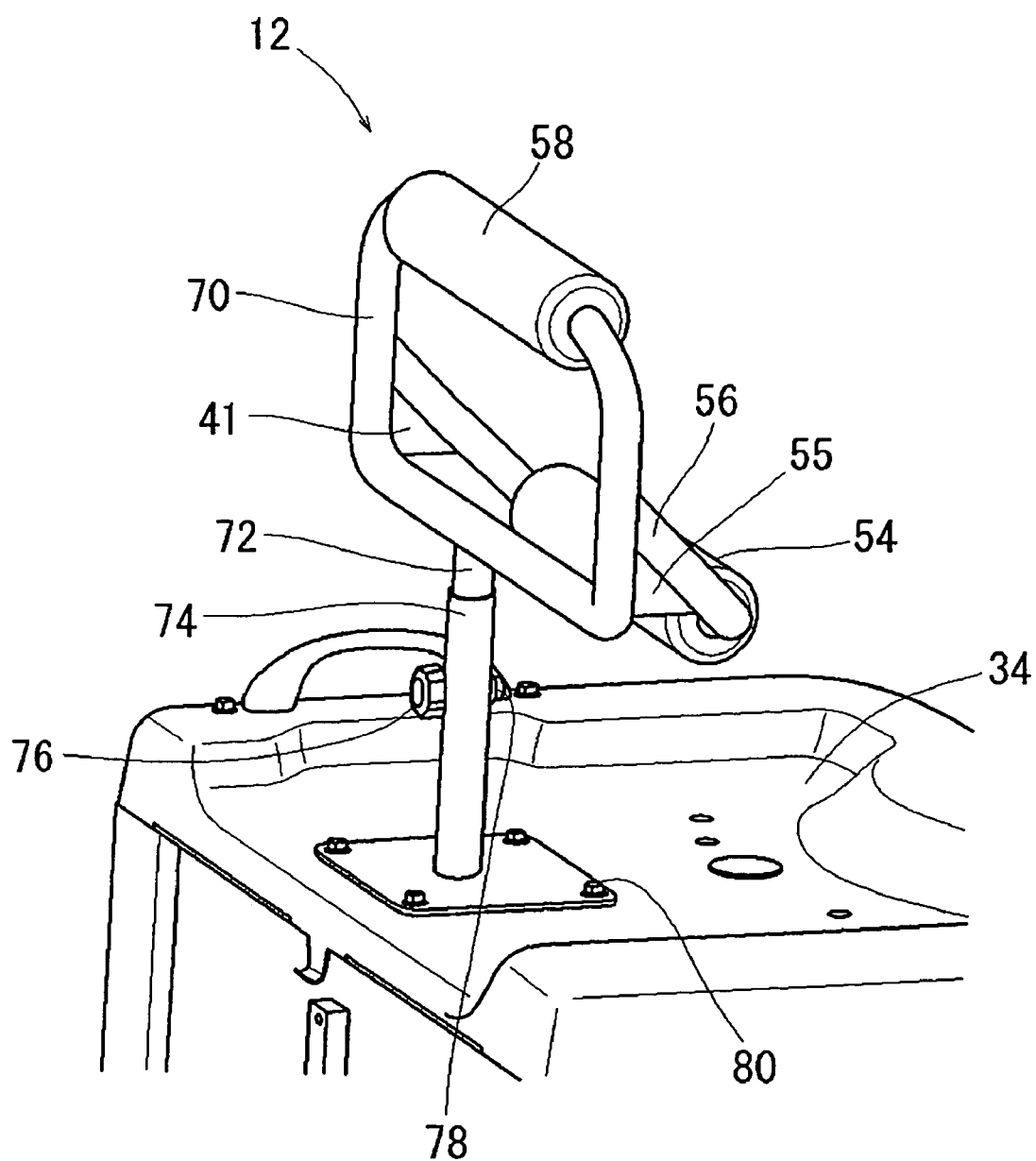
FIG. 17 is a perspective view of a backrest mechanism, showing a backrest portion used for another type of support according to an alternative embodiment of the present invention.
Figure 18:
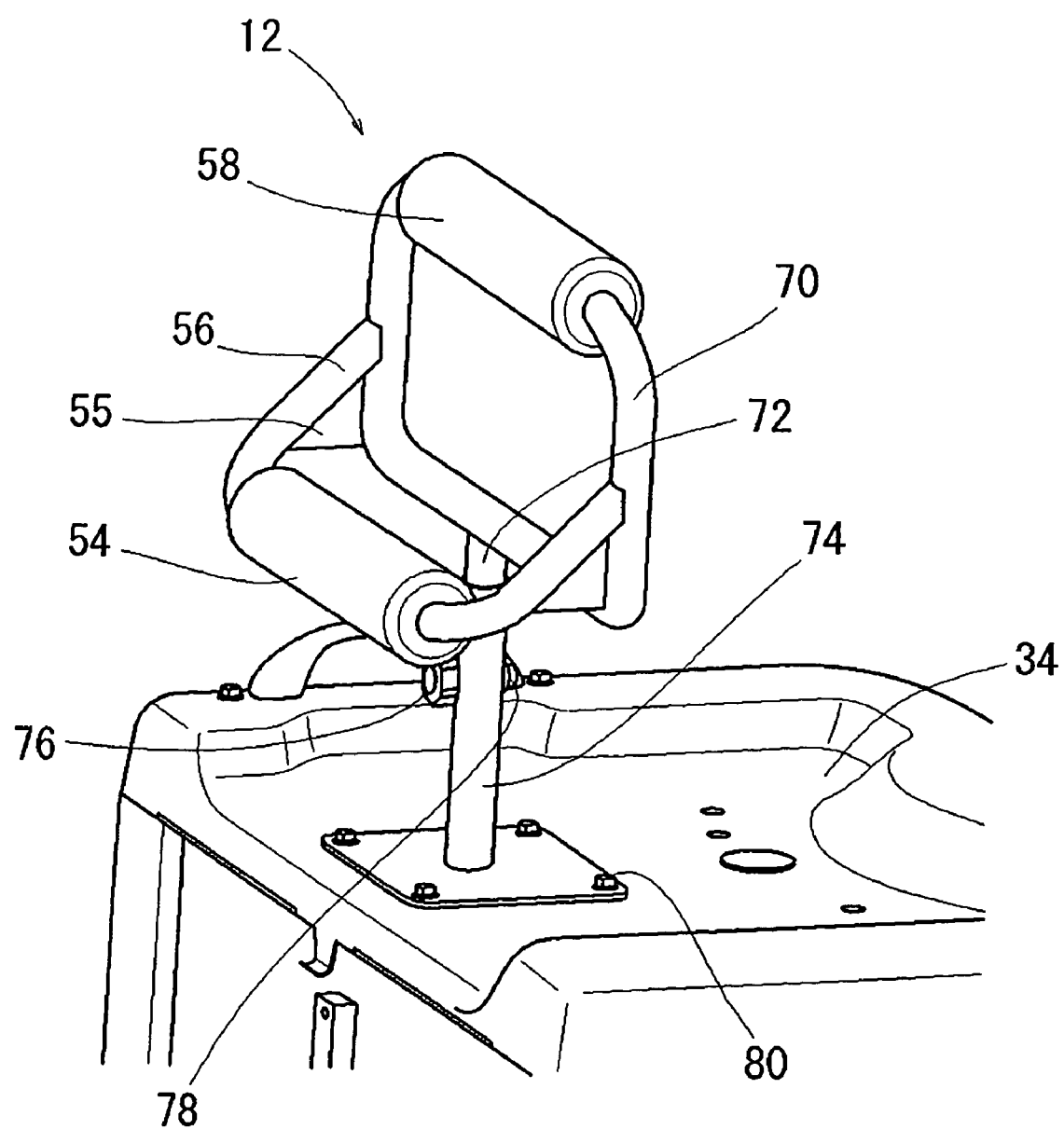
FIG. 18 is a perspective view of a backrest mechanism, showing a seat portion used for another type of support according to an alternative embodiment of the present invention.

In the above alternative embodiment, when the backrest portion 70 is positioned forward of the seat portion 56 as shown in FIG. 17, the operator is supported at the back by the cushion 58 (FIG. 8) in operating the towing tractor 10. On the other hand, when the seat portion 56 is located forward of the backrest portion 70 as shown in FIG. 18, the operator is supported at the buttocks by the cushion 54 (FIG. 9) while operating the towing tractor 10. Unlike the above-described embodiments (for example, the embodiment of FIG. 16), the backrest portion 70 need not be pulled out from the support holder 74 but it is merely rotated by 180 degrees to change the position of the support portion between FIG. 17 and FIG. 18. Thus, the position of the support portion may be changed more simply and quickly than those in the above-preferred embodiments.

Figure 19:
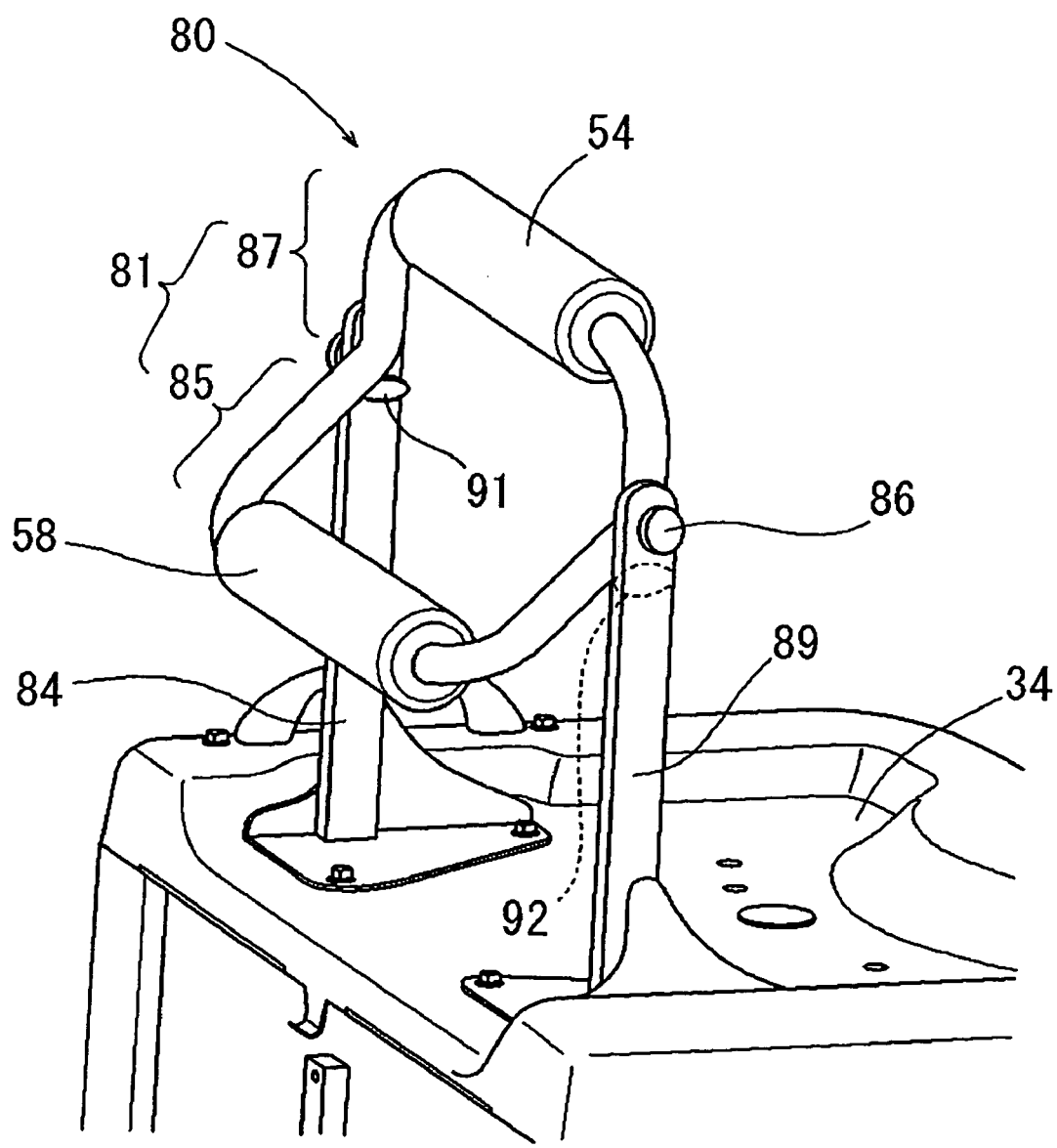
FIG. 19 is a perspective view of a backrest mechanism having a second angle adjustment mechanism according to an alternative embodiment of the present invention.
Figure 20:
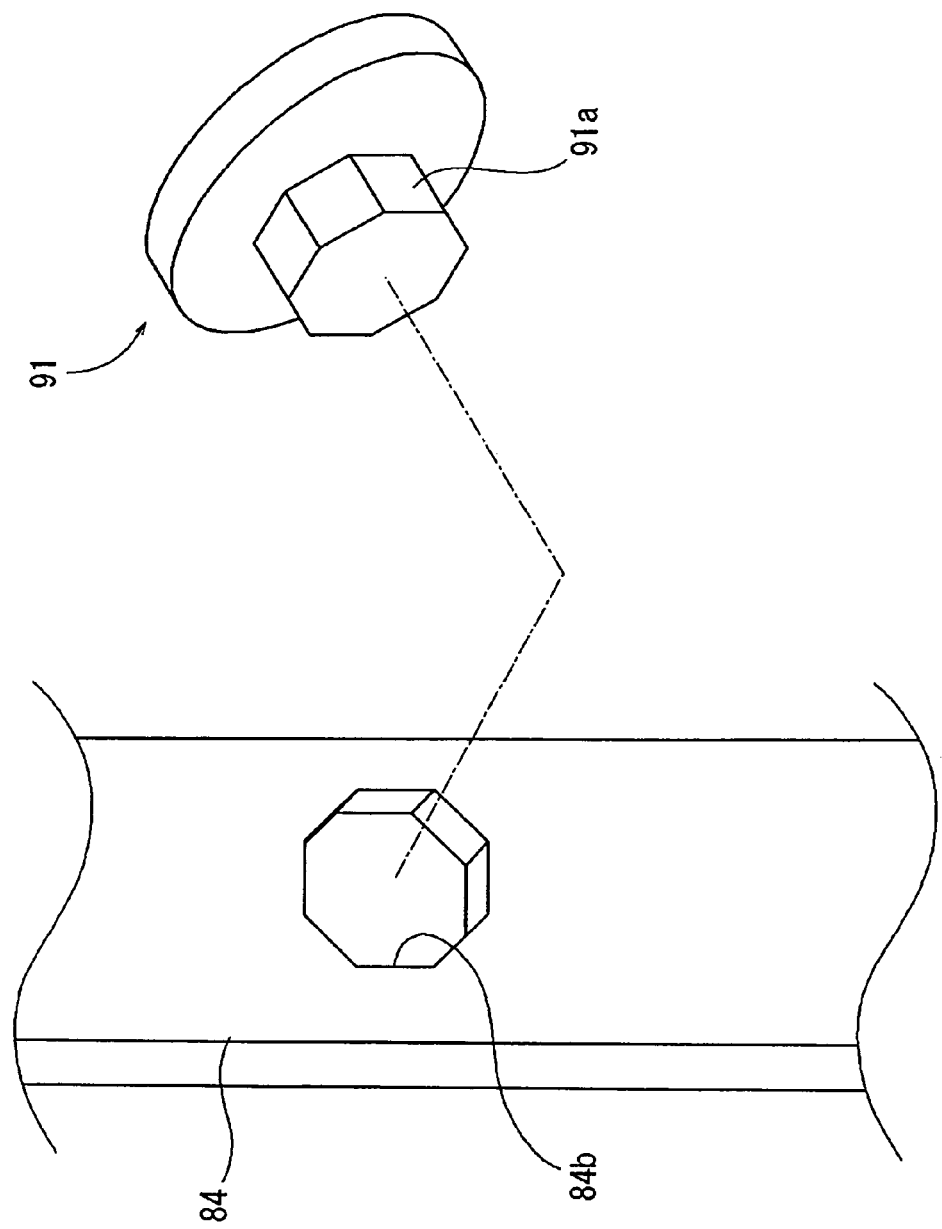
FIG. 20 is an exploded perspective view showing a structure of an adjustment knob according to an alternative embodiment of the present invention.

(c4) In the second preferred embodiment, the trapezoidal stop plates 83, 88 are provided for preventing the support member 81 from being turned (FIGS. 10 and 12). In an alternative embodiment, the angle between the support member 81 and the support holders 84, 89 may be changed. For example, as shown in FIG. 19, a stop plate 91 is provided for the support holder 84 in place of the stop plate 83, and a stop plate 92 is provided for the support holder 89 in place of the stop plate 88. The stop plates 91, 92 are formed in a cylindroidal shape. The stop. plate 91 is provided with a projection 91a (FIG. 20) having a shape of an octagonal prism and fitted into a hole 84b formed in the support holder 84. The stop plates 91, 92 and the hole 84b correspond to the second angle adjustment mechanism of the present invention.

Figure 21:
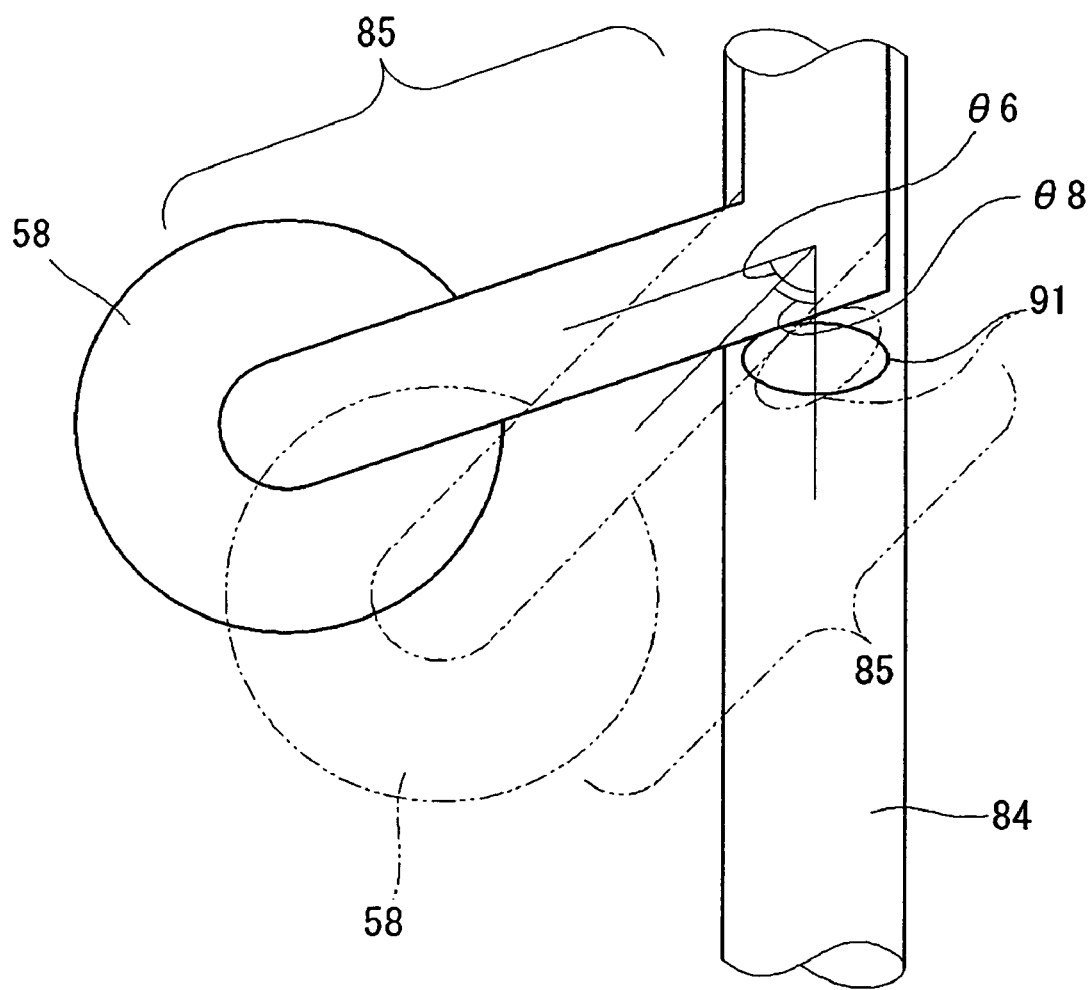
FIG. 21 is a side view showing a way to adjust an angle by adjustment knob according to an alternative embodiment of the present invention.

Depending on the position of the projection 91a fitted in the hole 84b, the position where the shared portion 85 of the support member 81 contacts with the stop plate 91 is varied. In an example shown in FIG. 21, when the stop plate 91 is fitted as indicated by solid line, the support member 81 makes an angle θ 6 with the support holders 84, 89. When the stop plate 91 is fitted as indicated by two-dotted line, on the other hand, the support member 81 makes an angle θ 8 (which is smaller than the angle θ 6) with the support holders 84, 89. Though the stop plate 91 has been described in the above example, the same applies to the stop plate 92. Thus, since the angle between the support member 81 and the support holders 84, 89 is adjustable to fit the operator's figure (especially, the buttocks), operator's fatigue may be reduced by ensuring more comfortable operating position.

Figure 22:
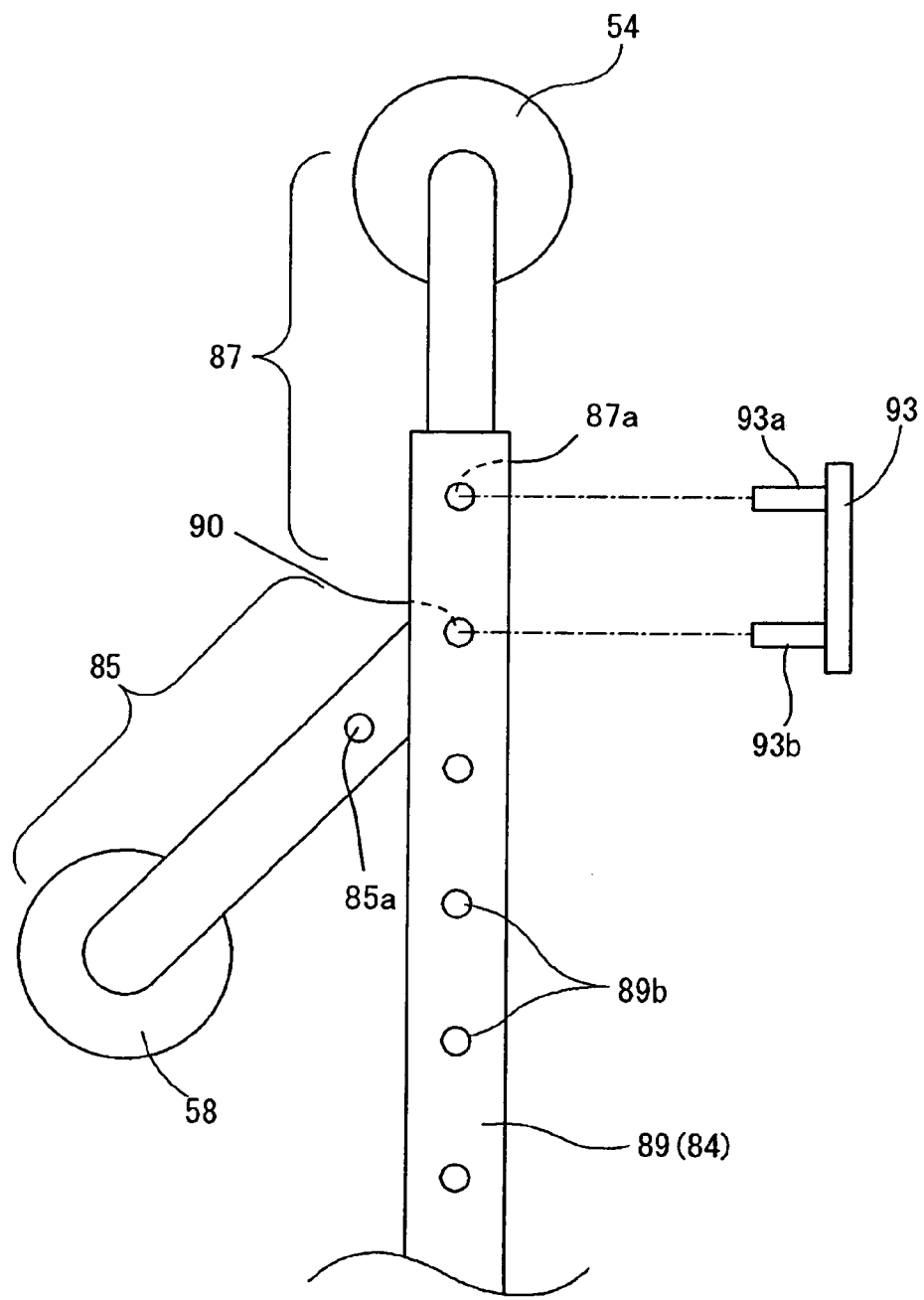
FIG. 22 is a side view of a backrest mechanism, showing a manner to prevent rotation according to an alternative embodiment of the present invention.

(c5) In the second preferred embodiment, the screws are used for holding the support member 81 to the support holders 84, 89 (FIG. 11). In an alternative embodiment, a rotation prevention member is used for holding the support member 81 to the support holders 84, 89. Referring to FIG. 22, a rotation prevention member 93 having a rod-like projections 93a, 93b is provided. On the other hand, the shared portion 85 has a hole 85a, the backrest portion 87 has a hole 87a and the support holder 89 has a plurality of holes 89b. One of the projections 93a, 93b is fitted into the hole 90, and the other is fitted into the hole 85a (or the hole 87a) through one of the holes 89b. Simply fitting the two projections 93a, 93b of the rotation prevention member 93 into the holes, rotation of the support member 81 is prevented. In addition, providing more number of holes 89b in vertical and longitudinal direction of the support holder 89, the height of the support member 81 may be adjusted depending on holes into which the projections 93a, 93b are fitted.

Figure 23:
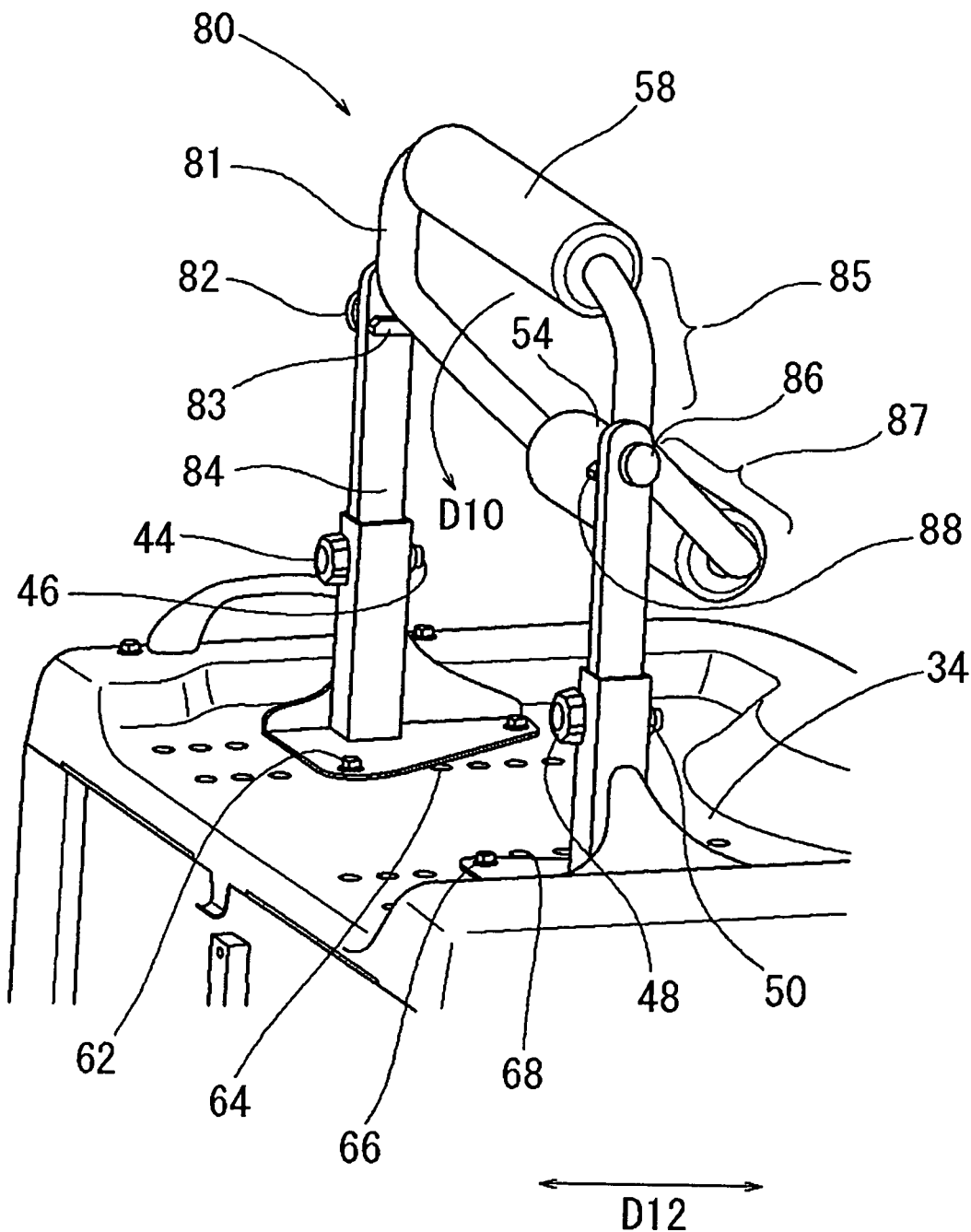
FIG. 23 is a perspective view of a backrest mechanism having a horizontal positioning mechanism according to an alternative embodiment of the present invention.

(c6) In the second preferred embodiment, as well as in the first preferred embodiment, the support holders 84, 89 are located at a fixed position on the upper surface of the battery casing 34 (for example, FIG. 10). In an alternative embodiment, it may be so arranged that the position of the support holders 84, 89 is horizontally adjustable in longitudinal direction of the vehicle. The structure of this alternative embodiment, which is similar to the case (c2), is shown in FIG. 23. In this case, the horizontal position of the shared portion 85 or the backrest portion 87 is adjustable longitudinally, so that operator's fatigue may be reduced by ensuring more comfortable operating position.

(c7) In the first and second preferred embodiments, the seat portion 56 is made of a bent pipe for the sake of light-weightness and is provided with the cushion 54 (for example, refer to FIG. 7). In an alternative embodiment, the seat portion may be made so as not only to support operator's buttocks, but also to support operator's lumbar. For example, the seat portion may be formed with an arm-rest (so-called, bucket seat) for supporting the operator's back from both sides. The seat portion of such a bucket seat type is capable supporting the operator with increased stability when the vehicle travels along a curve. To enhance the rigidity of the backrest portion and the seat portion, they should be made of a bent solid bar.

(c8) In the first and second preferred embodiments, the present invention is applied to the towing tractor 10 as an industrial vehicle. In an alternative embodiment, the present invention may be applied to stand-up rider operator's platform industrial vehicles other than the towing tractors, such as order picking trucks and reach fork lift trucks. Furthermore, in the above-described embodiments, the height of the backrest portion or the seat portion is adjusted by mechanical means. In an alternative embodiment, height adjustment for the backrest portion or the seat portion is made by hydraulic pressure means, such as hydraulic dampers and air dampers, installed in the support holders 42, 52. Bolts and nuts are used for fixing the members in the preceding embodiments. However, another fixing means such as screw, adhesive and welding may be used for fixing the members. These alternative means may be easily applied, so that the advantageous effects as in the case of the first and second preferred embodiments are obtained.

Therefore, the present examples and embodiments are to be considered as illustrative and not restrictive, and the invention is not to be limited to the details given herein but may be modified within the scope of the appended claims.

What is claimed is:

1. A backrest mechanism for a stand-up rider operator's platform in an industrial vehicle, in which an operator operates the vehicle while standing, comprising:
   a support portion having a backrest portion for supporting a back of the operator and a seat portion for at least supporting buttocks of the operator, wherein the support portion supports the operator by either of the backrest portion and the seat portion; and
   a support holder located on a rear side of the vehicle from the operator's platform, wherein the support holder holds the support portion so that the support portion is detachable from the support holder.

2. The backrest mechanism according to claim 1, further comprising:
   a first angle adjustment mechanism for adjusting an angle between the backrest portion and the seat portion.

3. The backrest mechanism according to claim 1, wherein a position for supporting the operator by the backrest portion and a position for supporting the operator by the seat portion are changeable depending on a direction in which the support portion is held by the support holder.

4. The backrest mechanism according to claim 1, further comprising:
mechanical means or hydraulic pressure means provided for adjusting height of the support portion.

5. The backrest mechanism according to claim 1, further comprising:
a horizontal positioning mechanism provided for adjusting a horizontal position of the support holder.

6. A backrest mechanism for a stand-up rider operator's platform in an industrial vehicle, in which an operator operates the vehicle while standing, comprising:
a support portion having a shared portion which serves as a backrest portion for supporting a back of the operator when the shared portion is in a first position and which serves as a seat portion for at least supporting buttocks of the operator when the shared portion is in a second position, wherein the support portion supports the operator by the shared portion; and
a support holder located on a rear side of the vehicle from the operator's platform, wherein the support holder holds the support portion so that the support portion is rotatable relative to the support holder.

7. The backrest mechanism according to claim 6, further comprising:
a second angle adjustment mechanism for adjusting an angle between the support holder and the seat portion.

8. The backrest mechanism according to claim 6, further comprising:
a rotation prevention member provided for preventing rotation of the support portion, wherein the rotation prevention member holds a position after the position of the support portion is rotated and changed between the first position and the second position.

9. The backrest mechanism according to claim 6, further comprising:
mechanical means or hydraulic pressure means provided for adjusting height of the support portion.

10. The backrest mechanism according to claim 6, further comprising:
a horizontal positioning mechanism provided for adjusting a horizontal position of the support holder.

* * * * *

UNITED STATES PATENT AND TRADEMARK OFFICE
CERTIFICATE OF CORRECTION

PATENT NO. : 7,461,885 B2
APPLICATION NO. : 11/544154
DATED : December 9, 2008
INVENTOR(S) : Akira Mochizuki et al.

It is certified that error appears in the above-identified patent and that said Letters Patent is hereby corrected as shown below:

In the Specification

On the Title Page, Item (73), please delete "Kabushiki Kaisha Toytoa Jidoshokki" and insert therefore -- Kabushiki Kaisha Toyota Jidoshokki --;

Column 1, line 9, please delete "Some of industrial vehicles" and insert therefore -- Some industrial vehicles --;

Column 1, lines 13-14, please delete "generally has no seat for operator," and insert therefore -- generally has no seat for the operator, --;

Column 1, lines 17-18, please delete "which is directed to stabilize operator's position." and insert therefore -- which is directed to stabilize the operator's position. --;

Column 1, lines 22-23, please delete "impedes operator's movement" and insert therefore -- impedes the operator's movement --;

Column 1, lines 29-30, please delete "in accordance with operator's physical condition," and insert therefore -- in accordance with the operator's physical condition, --;

Column 3, line 37, please delete "no seat for operator," and insert therefore -- no seat for the operator, --;

Column 3, line 55, please delete "reinforcing plates 41, 55 provided at lower side" and insert therefore -- reinforcing plates 41, 55 provided at the lower side --;

Column 4, lines 7-8, please delete "and then rotated by 180 degree" and insert therefore -- and then rotated 180 degrees --;

Column 4, lines 35-36, please delete "a position that either of the backrest portion and the seat portion 56" and insert therefore -- a position that either of the backrest portion 40 and the seat portion 56 --;

UNITED STATES PATENT AND TRADEMARK OFFICE
CERTIFICATE OF CORRECTION

PATENT NO.       : 7,461,885 B2
APPLICATION NO.  : 11/544154
DATED            : December 9, 2008
INVENTOR(S)      : Akira Mochizuki et al.

It is certified that error appears in the above-identified patent and that said Letters Patent is hereby corrected as shown below:

Column 4, lines 36-37, please delete "Thus, in view of operator's condition," and insert therefore -- Thus, in view of the operator's condition, --;

Column 4, lines 48-49, please delete "in accordance with operator's height." and insert therefore -- in accordance with the operator's height. --;

Column 4, lines 49-50, please delete "thereby helping to reduce operator's fatigue." and insert therefore -- thereby helping to reduce the operator's fatigue. --;

Column 6, lines 21-23 and 37-38, please delete "so that operator's fatigue may be reduced by ensuring more comfortable operating position." and insert therefore -- so that the operator's fatigue may be reduced by ensuring a more comfortable operating position. --;

Column 7, line 29, please delete "The stop. plate 91" and insert therefore -- The stop plate 91 --;

Column 7, lines 47-49, please delete "(especially the buttocks), operator's fatigue may be reduced by ensuring more comfortable operating position." and insert therefore -- (especially the buttocks), the operator's fatigue may be reduced by ensuring a more comfortable operating position. --;

Column 7, lines 55-56, please delete "rotation prevention member 93 having a rod-like projections 93a, 93b" and insert therefore -- rotation prevention member 93 having rod-like projections 93a, 93b -- ;

Column 8, lines 11-12, please delete "so that operator's fatigue may be reduced by ensuring more comfortable operating position." and insert therefore -- so that the operator's fatigue may be reduced by ensuring a more comfortable operating position. --;

UNITED STATES PATENT AND TRADEMARK OFFICE
CERTIFICATE OF CORRECTION

PATENT NO. : 7,461,885 B2
APPLICATION NO. : 11/544154
DATED : December 9, 2008
INVENTOR(S) : Akira Mochizuki et al.

It is certified that error appears in the above-identified patent and that said Letters Patent is hereby corrected as shown below:

Column 8, lines 13-15, please delete "the seat portion 56 is made of a bent pipe for the sake of light-weightness" and insert therefore -- the seat portion 56 is made of a bent pipe so as to be of light weight --;

Column 8, lines 17-18, please delete "so as not only to support operator's buttocks, but also to support operator's lumbar." and insert therefore -- so as not only to support the operator's buttocks, but also to support the operator's lumbar. --; and Column 8, lines 21-22, please delete "a bucket seat type is capable supporting the operator" and insert therefore -- a bucket seat type is capable of supporting the operator --.

Signed and Sealed this

Twenty-fifth Day of August, 2009

David J. Kappos
*Director of the United States Patent and Trademark Office*